US009909766B2

(12) United States Patent
Bagwell et al.

(10) Patent No.: US 9,909,766 B2
(45) **Date of Patent: *Mar. 6, 2018**

(54) REAL-TIME CONTROL OF EXHAUST FLOW

(71) Applicant: OY HALTON GROUP LTD., Helsinki (FI)

(72) Inventors: Rick A. Bagwell, Scottsville, KY (US); Derek Schrock, Bowling Green, KY (US); Andrey Livchak, Bowling Green, KY (US)

(73) Assignee: OY HALTON GROUP LTD., Vantaa (FI)

( * ) Notice: Subject to any disclaimer, the term of this patent is extended or adjusted under 35 U.S.C. 154(b) by 0 days.

This patent is subject to a terminal disclaimer.

(21) Appl. No.: 15/149,305

(22) Filed: May 9, 2016

(65) Prior Publication Data

US 2016/0252256 A1 Sep. 1, 2016

Related U.S. Application Data

(63) Continuation of application No. 13/845,635, filed on Mar. 18, 2013, now Pat. No. 9,335,057, which is a (Continued)

(51) Int. Cl.

| | |
|---|---|
| ***F24C 15/20*** | (2006.01) |
| ***F15D 1/02*** | (2006.01) |
| *A47J 36/38* | (2006.01) |

(52) U.S. Cl.

CPC ............ *F24C 15/2021* (2013.01); *F15D 1/02* (2013.01); *F24C 15/20* (2013.01); (Continued)

(58) Field of Classification Search

CPC .............. F24C 15/2021; F24C 15/2035; F24C 15/2028; F24C 15/20; F15D 1/02; Y10T 137/0391; Y10T 137/0324; A47J 36/38

(Continued)

(56) References Cited

U.S. PATENT DOCUMENTS

| | | |
|---|---|---|
| 3,045,705 A | 7/1962 | Hausammann |
| 3,323,439 A | 6/1967 | Waever et al. |

(Continued)

FOREIGN PATENT DOCUMENTS

| | | | |
|---|---|---|---|
| CA | 2297682 A1 * | 8/2001 | .......... F24C 15/2021 |
| CA | 2297682 | 4/2008 | |

(Continued)

OTHER PUBLICATIONS

Office Action for U.S. Appl. No. 14/928,628 dated Mar. 21, 2017.
Summary for Lumley et al., "A First Course of Turbulence", Massachusetts Institute of Technology, Mar. 1972.

*Primary Examiner* — Gregory Huson
*Assistant Examiner* — Daniel E Namay
(74) *Attorney, Agent, or Firm* — Potomac Law Group, PLLC; Mark Catan

(57) ABSTRACT

A flow control system for controlling exhaust flow can measure effluent escaping from the exhaust hood at a given flow rate. An interferometric detector can measure fluctuations in fluid properties external to and/or in the vicinity of the exhaust hood. The flow control system may vary a flow rate of the exhaust hood and/or control exhaust hood structures responsive to the measurements to contain the effluent while minimizing the exhaust of air from the occupied space.

10 Claims, 38 Drawing Sheets

Related U.S. Application Data continuation of application No. 13/073,706, filed on Mar. 28, 2011, now abandoned, which is a continuation of application No. 10/907,300, filed on Mar. 28, 2005, now abandoned, and a continuation-in-part of application No. 10/344,505, filed as application No. PCT/US01/25063 on Aug. 10, 2001, now Pat. No. 6,899,095.

(60) Provisional application No. 60/590,889, filed on Jul. 23, 2004, provisional application No. 60/263,557, filed on Jan. 23, 2001.

(52) U.S. Cl.
CPC ...... *F24C 15/2028* (2013.01); *F24C 15/2035* (2013.01); *F24C 15/2042* (2013.01); *Y10T 137/0324* (2015.04); *Y10T 137/0391* (2015.04)

(58) Field of Classification Search
USPC ...... 126/299 D, 299 R; 356/439; 454/49, 67, 454/256
See application file for complete search history.

(56) References Cited

U.S. PATENT DOCUMENTS

| | | | |
|---|---|---|---|
| 3,332,676 | A | 7/1967 | Namy |
| 3,381,134 | A | 4/1968 | Wolf |
| 3,457,850 | A | 7/1969 | Sweet et al. |
| 3,612,106 | A | 10/1971 | Camboulives et al. |
| 3,809,480 | A | 5/1974 | Somerville et al. |
| 3,825,346 | A | 7/1974 | Rizzo |
| 3,866,055 | A | 2/1975 | Pike |
| 4,105,015 | A | 8/1978 | Isom |
| 4,155,348 | A | 5/1979 | Ahlrich |
| 4,160,407 | A | 7/1979 | Duym |
| 4,346,692 | A | 8/1982 | McCauley |
| 4,398,415 | A | 8/1983 | Jacocks et al. |
| 4,475,534 | A | 10/1984 | Moriarty |
| 4,497,242 | A | 2/1985 | Moyer |
| 4,584,929 | A | 4/1986 | Jarmyer et al. |
| 4,617,909 | A | 10/1986 | Molitor |
| 4,706,553 | A | 11/1987 | Sharp et al. |
| 4,781,460 | A | 11/1988 | Bott |
| 4,872,892 | A | 10/1989 | Vartiainen et al. |
| 4,878,892 | A | 11/1989 | Sibalis et al. |
| 4,903,394 | A | 2/1990 | Pellinen et al. |
| 4,903,685 | A | 2/1990 | Melink |
| 5,042,453 | A | 8/1991 | Shellenberger |
| 5,042,456 | A | 8/1991 | Cote |
| 5,092,227 | A | 3/1992 | Ahmed et al. |
| 5,139,009 | A | 8/1992 | Walsh |
| 5,146,284 | A | 9/1992 | Tabarelli et al. |
| 5,240,455 | A | 8/1993 | Sharp |
| 5,251,608 | A | 10/1993 | Cote |
| 5,268,739 | A | 12/1993 | Martinelli et al. |
| 5,322,473 | A | 6/1994 | Hofstra et al. |
| 5,394,861 | A | 3/1995 | Stegmaier |
| 5,414,509 | A | 5/1995 | Veligdan |
| 5,522,377 | A | 6/1996 | Fritz |
| 5,528,040 | A | 6/1996 | Lehmann |
| 5,597,354 | A | 1/1997 | Janu et al. |
| 5,642,784 | A | 7/1997 | Guay et al. |
| 5,690,093 | A | 11/1997 | Schrank et al. |
| 5,713,346 | A | 2/1998 | Kuechler |
| 5,718,219 | A | 2/1998 | Boudreault |
| 5,720,274 | A | 2/1998 | Brunner et al. |
| 5,764,579 | A | 6/1998 | McMasters et al. |
| 5,779,538 | A | 7/1998 | Jardinier |
| 5,874,292 | A | 2/1999 | McMinn, Jr. |
| 5,882,254 | A | 3/1999 | Jacob |
| 5,960,786 | A | 10/1999 | Lambertson |
| 6,089,970 | A | 7/2000 | Feustel |
| 6,142,142 | A | 11/2000 | Woodall et al. |
| 6,170,480 | B1 | 1/2001 | Melink et al. |
| 6,173,710 | B1 | 1/2001 | Gibson et al. |
| 6,252,689 | B1 | 6/2001 | Sharp |
| 6,336,451 | B1 | 1/2002 | Rohl-Hager et al. |
| 6,351,999 | B1 | 3/2002 | Maul et al. |
| 6,428,408 | B1 | 8/2002 | Bell et al. |
| 6,446,624 | B1 | 9/2002 | Chu |
| 6,474,084 | B2 | 11/2002 | Gauthier et al. |
| 6,484,713 | B1 | 11/2002 | Schmitt et al. |
| 6,506,109 | B1 | 1/2003 | Bastian et al. |
| 6,549,554 | B2 | 4/2003 | Shiojima et al. |
| 6,634,939 | B2 | 10/2003 | Johnson |
| 6,637,667 | B2 | 10/2003 | Gauthier et al. |
| 6,645,066 | B2 | 11/2003 | Gutta et al. |
| 6,726,111 | B2 | 4/2004 | Weimer et al. |
| 6,820,609 | B2 | 11/2004 | Woodall et al. |
| 6,846,236 | B2 | 1/2005 | Gregoricka |
| 6,851,421 | B2 | 2/2005 | Livchak et al. |
| 6,869,468 | B2 | 3/2005 | Gibson |
| 6,878,195 | B2 | 4/2005 | Gibson |
| 6,890,252 | B2 | 5/2005 | Liu |
| 6,899,095 | B2 | 5/2005 | Livchak |
| 6,916,239 | B2 | 7/2005 | Siddaramanna et al. |
| 6,935,943 | B2 | 8/2005 | Desai |
| 7,048,199 | B2 | 5/2006 | Melink |
| 7,147,168 | B1 * | 12/2006 | Bagwell .................. B08B 15/00 165/237 |
| 7,331,852 | B2 * | 2/2008 | Ezell .................... F24F 11/0017 340/632 |
| 7,364,094 | B2 | 4/2008 | Bagwell et al. |
| 7,442,119 | B2 | 10/2008 | Fluhrer |
| 7,516,622 | B2 | 4/2009 | Gauthier et al. |
| 7,651,034 | B2 | 1/2010 | Weimer et al. |
| RE42,735 | E * | 9/2011 | Bagwell .................. B08B 15/00 236/49.3 |
| 8,038,515 | B2 | 10/2011 | Livchak |
| 9,335,057 | B2 | 5/2016 | Bagwell et al. |
| 2003/0146082 | A1 | 8/2003 | Gibson et al. |
| 2003/0218752 | A1 | 11/2003 | Drasek et al. |
| 2004/0014417 | A1 | 1/2004 | Katz |
| 2004/0035411 | A1 | 2/2004 | Livchak et al. |
| 2005/0229922 | A1 | 10/2005 | Magner et al. |
| 2005/0279845 | A1 | 12/2005 | Bagwell et al. |
| 2006/0032492 | A1 | 2/2006 | Bagwell et al. |
| 2006/0219235 | A1 | 10/2006 | Bagwell et al. |
| 2007/0015449 | A1 | 1/2007 | Livchak et al. |
| 2007/0023349 | A1 | 2/2007 | Kyllonen et al. |
| 2007/0068509 | A1 | 3/2007 | Bagwell et al. |
| 2007/0184771 | A1 | 8/2007 | Fluhrer |
| 2007/0272230 | A9 | 11/2007 | Meredith et al. |
| 2008/0045132 | A1 | 2/2008 | Livchak et al. |
| 2009/0032011 | A1 | 2/2009 | Livchak et al. |
| 2011/0005507 | A9 | 1/2011 | Bagwell |
| 2011/0174384 | A1 | 7/2011 | Bagwell |
| 2013/0213483 | A1 | 8/2013 | Bagwell |
| 2016/0252256 | A1 * | 9/2016 | Bagwell .................... F15D 1/02 |

FOREIGN PATENT DOCUMENTS

| | | | | |
|---|---|---|---|---|
| DE | 19911850 | A1 | 9/2000 | |
| EP | 0753706 | B1 | 11/2000 | |
| GB | 2054143 | A | 2/1981 | |
| GB | 2266340 | A | 10/1993 | |
| JP | 63201048 | A | 8/1988 | |
| JP | 63204048 | A | 8/1988 | |
| JP | 2002033552 | A | 1/2002 | |
| WO | 9008922 | A1 | 8/1990 | |
| WO | WO 9008922 | A1 * | 8/1990 | .......... F24C 15/2021 |
| WO | 1997048479 | A1 | 12/1997 | |
| WO | 0151857 | A | 7/2001 | |
| WO | 0214728 | A | 2/2002 | |
| WO | 2002014746 | A1 | 2/2002 | |
| WO | 2005019736 | A1 | 3/2005 | |
| WO | 2005114059 | A2 | 12/2005 | |
| WO | 2006002190 | A2 | 1/2006 | |
| WO | 2006012628 | A2 | 2/2006 | |
| WO | 2006074420 | A2 | 7/2006 | |

(56) References Cited

FOREIGN PATENT DOCUMENTS

| | | | |
|---|---|---|---|
| WO | 2006074425 | A1 | 7/2006 |
| WO | 2007121461 | A2 | 10/2007 |

* cited by examiner

REAL-TIME CONTROL OF EXHAUST FLOW

CROSS REFERENCE TO RELATED APPLICATIONS

The present application is a continuation of U.S. application Ser. No. 13/845,635, filed Mar. 18, 2013, which is a continuation of U.S. application Ser. No. 13/073,706, filed Mar. 28, 2011, abandoned, which is a continuation of U.S. application Ser. No. 10/907,300, filed Mar. 28, 2005, abandoned, which claims the benefit of U.S. Provisional Application No. 60/590,889, filed Jul. 23, 2004, and is a continuation-in-part (CIP) of U.S. patent application Ser. No. 10/344,505, filed Jun. 11, 2003, now U.S. Pat. No. 6,899, 095, issued May 31, 2005, which is a national stage entry of International Application No. PCT/US2001/25063, filed Aug. 10, 2001, which claims the benefit of U.S. Provisional Application No. 60/263,557, filed Jan. 23, 2001, all of which are hereby incorporated by reference herein in their entireties.

FIELD

The present disclosure relates generally to flow-volume control devices. More specifically, the present invention relates to flow control devices that may be used for balancing fluid flow in a context where suspended particles are entrained in the fluid and their precipitation must be avoided, in free-flowing parts of a flow system, except during filtration.

BACKGROUND

Exhaust hoods are used to remove air contaminants close to the source of generation located in a conditioned space. For example, one type of exhaust hoods, kitchen range hoods, creates suction zones directly above ranges, fryers, or other sources of air contamination. Exhaust hoods tend to waste energy because they must draw some air out of a conditioned space in order to insure that all the contaminants are removed. As a result, a perennial problem with exhaust hoods is minimizing the amount of conditioned air required to achieve total capture and containment of the contaminant stream.

Referring to FIG. 1, a typical prior art exhaust hood 90 is located over a range 15. The exhaust hood 90 has a recess 55 with at least one vent 65 (covered by a filter 60) and an exhaust duct 30 leading to an exhaust system (not shown) that draws off contaminated air 45. The vent 65 is an opening in a barrier 35 defining a plenum 37 and a wall of the canopy recess 55. The exhaust system usually consists of external ductwork and one or more fans that pull air and contaminants out of a building and discharge them to a treatment facility or into the atmosphere. The recess 55 of the exhaust hood 90 plays an important role in capturing the contaminant because heat, as well as particulate and vapor contamination, are usually produced by the contaminant-producing processes. The heat causes its own thermal convection-driven flow or plume 10 which must be captured by the hood within its recess 55 while the contaminant is steadily drawn out of the hood. The recess creates a buffer zone to help insure that transient, or fluctuating, surges in the convection plume do not escape the steady exhaust flow through the vent. The convection-driven flow or plume 10 may form a vortical flow pattern 20 due to its momentum and confinement in the hood recess. The Coanda effect causes the thermal plume 10 to cling to the back wall. The exhaust rate in all practical applications is such that room air 5 is drawn off along with the contaminants.

Referring now also to FIG. 2, exhaust hoods 90, such as illustrated in FIG. 1, vary in length and can be manufactured to be very long as illustrated in FIG. 2. Here multiple vents 65 can be seen from a straight-on view from the vantage of a worker 80. The length can present a problem because the perimeter along which capture and containment must be achieved is longer near the ends than in the middle. In the middle, there is only one perimeter, the one along the forward edge indicated at 70 in FIG. 1. At the ends, this perimeter includes the side edge as well which is indicated at 75 in FIG. 1. The additional perimeter length that must be accommodated at the ends may be called an “end effect.” In other words, the hood cannot be approximated as a two-dimensional configuration because of its finite length. As a result of the increased perimeter at the ends, more air must be exhausted in the vicinity of the ends of the hood than in the middle because the perimeter at the ends consists of both the forward edge 70 of the hood adjacent the worker and end edges 75, which are perpendicular to the forward edge 70.

If the minimum exhaust rate for the entire hood is to be achieved, then less air should be exhausted near the middle section than near the ends. Otherwise, an excess rate of air exhaust will occur near the middle section to insure the rate at the ends is sufficient. Thus, as a result of the end effects and the requirement of full capture and containment, more air must be drawn through the middle section than necessary. In addition, a higher volume of effluent may be generated at some parts of a hood than at others. This variability leads to the same result: some parts of the hood may require a greater exhaust rate than others.

Referring to FIG. 3, a similar problem occurs when multiple hoods are connected to a single exhaust system. For example, the hoods may be connected to a common exhaust duct 191. Each hood must be balanced against the others so that each exhausts at the minimum rate that ensures full capture and containment of the contaminants. Again, ducts carrying grease aerosol should not have dampers because of the hazard caused by grease precipitation.

The particular embodiments are presented in the cause of providing what is believed to be the most useful and readily understood description of the principles and conceptual aspects of the invention. In this regard, no attempt is made to show structural details of the invention in more detail than is necessary for a fundamental understanding of the invention. The description, taken with the drawings, makes it apparent to those skilled in the art how the several forms of the invention may be embodied in practice.

DETAILED DESCRIPTION

The following U.S. patent applications are hereby incorporated by reference as if set forth in their entireties herein: U.S. patent application Ser. No. 10/344,505, entitled "Device and Method for Controlling/Balancing Fluid Flow-Volume Rate in Flow Channels," which entered the U.S. national stage on Jun. 11, 2003; U.S. Pat. No. 6,851,421, entitled "Exhaust Hood with Air Curtain," and U.S. patent application Ser. No. 10/638,754, entitled "Zone Control of Space Conditioning Systems with Varied Uses," filed Aug. 11, 2003.

Figure 4:
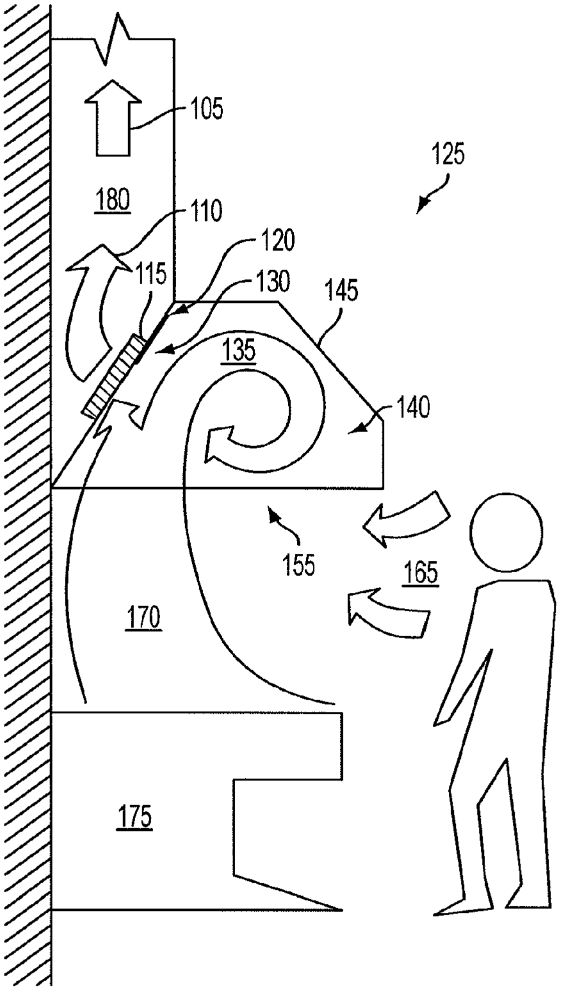
FIG. 4 is a side section view of a canopy style hood according to embodiment of the invention.

Referring to FIG. 4, a kitchen hood 125 has a canopy 145 positioned over a heat/contaminant source 175 (such as a grill) to capture a thermal convection plume 170 produced by the heat/contaminant source 175. The canopy 145 defines a recess 140, having an access 155. An exhaust fan (not shown) draws a flue stream 105 through an exhaust plenum or duct 180. Negative pressure in the exhaust duct 180 in turn draws gases residing in the recess 140 through a vent 130. In the vent 130 is a mechanical grease filter 115, set in a boundary wall that defines part of the recess 140. The filter reduces the mass of suspended grease particles in the resulting flue stream. The grease filter 115 may be an impingement filter or one based on cyclone type separation principles. The thermal convection plume 170 carries pollutants and air upwardly into the canopy recess 140 by buoyancy forces combined with forced convection resulting from the suction created by the exhaust fan. A combined effluent stream comprising the thermal convection plume 170 and conditioned air drawn from the space in which the hood 125 is located, flows into the vortex 135. This flow is extracted from the canopy recess 140 steadily forming the effluent stream 110, which becomes the flue stream 105.

Figure 1:
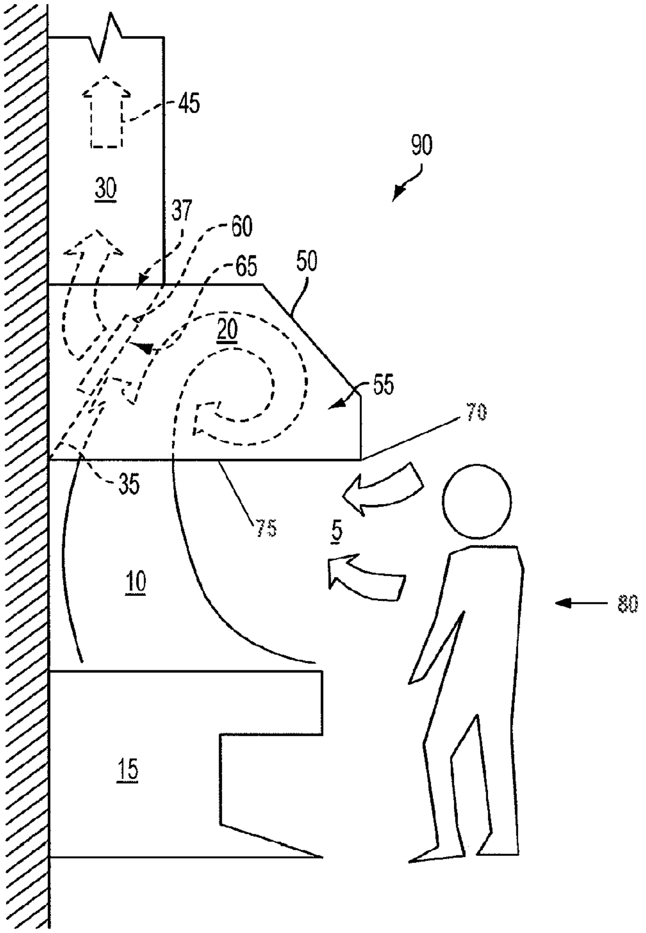
FIG. 1 PRIOR ART
FIG. 1 is a side view of a canopy style wall hood according to the prior art.
Figure 2:
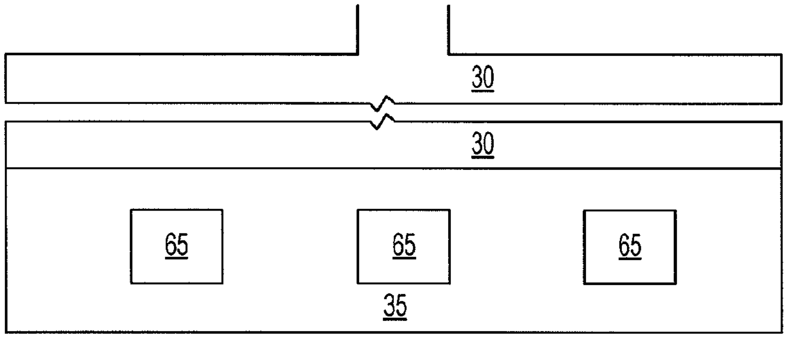
FIG. 2 PRIOR ART
FIG. 2 is a front view of a long canopy style hood with multiple vents.
Figure 3:
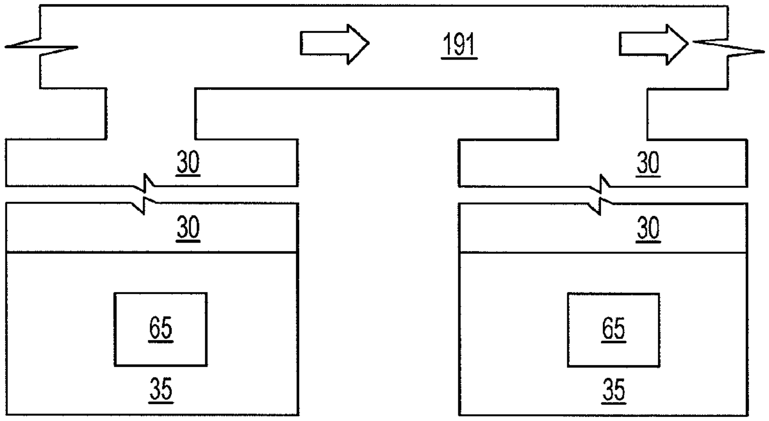
FIG. 3 PRIOR ART
FIG. 3 is a front view of multiple hoods attached to a common exhaust system.

The kitchen hood 125 may have multiple vents 130, each connected to the exhaust plenum 180. Alternatively, multiple exhaust plenums 180 may be connected to a single exhaust duct header (not shown but as indicated at 191 in FIG. 3) supplied by a single fan (not shown) as will be appreciated by those skilled in the relevant art. The exhaust rate through the exhaust plenum 180 or exhaust duct header determines the rate of extraction of effluent and indoor air 165 by the hood 125. The determination of the optimal flow rate involves a tradeoff between energy conservation and a requirement called capture and containment. Capture and containment is the state where no pollutant from the thermal plume 170 or the buffered volume in vortex 135 escapes into the conditioned space.

Full capture and containment requires the exhaust of at least some air 165 from the space in which the hood 125 is located. To conserve energy, the exhaust rate should be set at the lowest possible rate that still provides full capture and containment. This setting must account for the variability of the thermal plume 170, which varies with the cooking load, stage of cooking (e.g., rendering of fat which causes dripping and attendant smoke), and random variation (e.g., random dripping from fatty foods) or steam generation. Thus, not only does the exhaust load vary along the canopy 145 (in the direction into the plane of the drawing), as discussed in the background section, it also varies with time. The prior art approach has been one of setting the flow rate according to the peak expected load. This approach insures that the bulk exhaust rate is high enough to provide full capture and containment by the hood, or hood portion, requiring the greatest volume of exhaust to achieve it (capture and containment), at the times of maximum instantaneous load.

Again, the load can vary along the length of a long hood or from hood to hood and the balancing problem is analogous in balancing from hood portion to hood portion as it is for balancing from hood to hood.

In the present system, a flow control system is employed to permit modulation of the exhaust from one hood 125 to another or from one vent 130 to another along a single long hood 125. In addition, the potential exists to provide this flow control system, to be discussed herein, with real-time control. Thus, according to the inventive system, the exhaust rate may be controlled to achieve the lowest local ("local" referring generically to the respective hood portion or each respective hood linked to a common exhaust) exhaust rate required for the current local, instantaneous load. This is achieved by controlling the local exhaust rate by an active flow control device 120 linked to a real-time control (discussed in greater detail much later in the present specification).

Figure 5A:
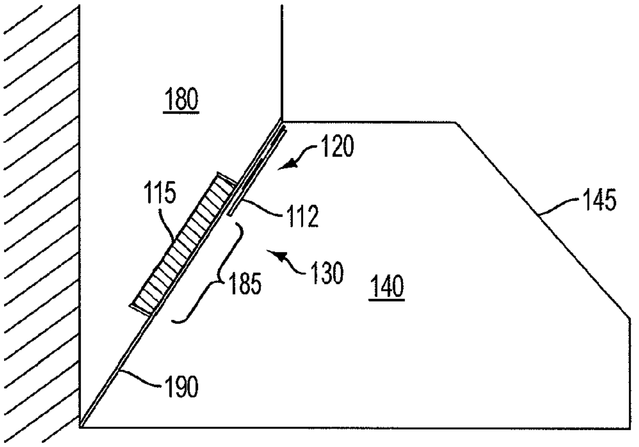
FIG. 5A is a section view of a canopy style hood according to the embodiment of FIG. 4.
Figure 5B:
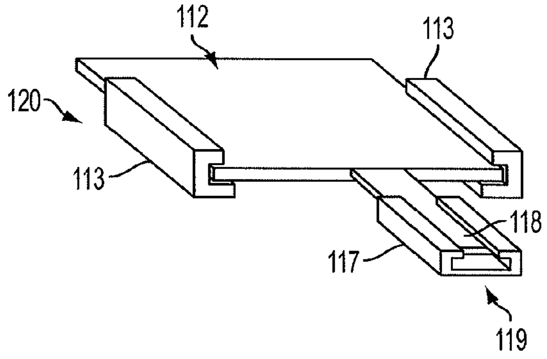
FIG. 5B is a perspective view of a shutter with an actuator mechanism according to an embodiment of the invention.
Figure 6:
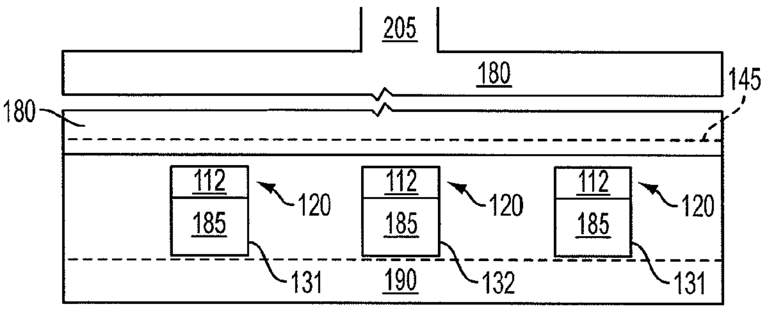
FIG. 6 is a front view of a canopy style hood with multiple vents including the shutter mechanism of FIG. 5B.

Referring now also to FIGS. 5A, 5B, and 6, to balance flow across a single hood canopy 145 (FIG. 6), or across multiple hoods connected to a single exhaust system (see FIG. 7), a flow control device 120 selectively blocks a portion of an exhaust vent 130 in a boundary wall 190 of the hood canopy 145. The flow control device 120 has a flat plate 112 partially covering the vent 130 defining an aperture 185. The flat plate 112 is selectively moved across the vent 130 which makes the aperture 185 variable-sized. The flat plate 112 may be moved by a linear actuator 119 such as a linear motor with a driver 118 and stator 117. The flat plate 112 may be guided by linear bearings 113. Note that the shape of the flow control device 120 is generally flat so that its impact on the shape of the canopy recess 140 is minimal. Thus, the flow control device 120 does not interfere with the vortical flow pattern 135. Where canopy 145 is of great length (again, "length" referring to the dimension perpendicular to the plane of the FIG. 5A drawing and best illustrated by FIG. 6), where multiple vents 130 are linked to a common exhaust duct 205, the respective flow control devices 120 may be set to provide a larger aperture 185 for the vents 131 close to the ends of the canopy 145 and to provide a smaller aperture 185 for the vents 132 near the middle of the canopy 145. Alternatively, if the type of cooking appliance or load varies along the length of the hood, the flow control devices 120 may be set accordingly.

Figure 7:
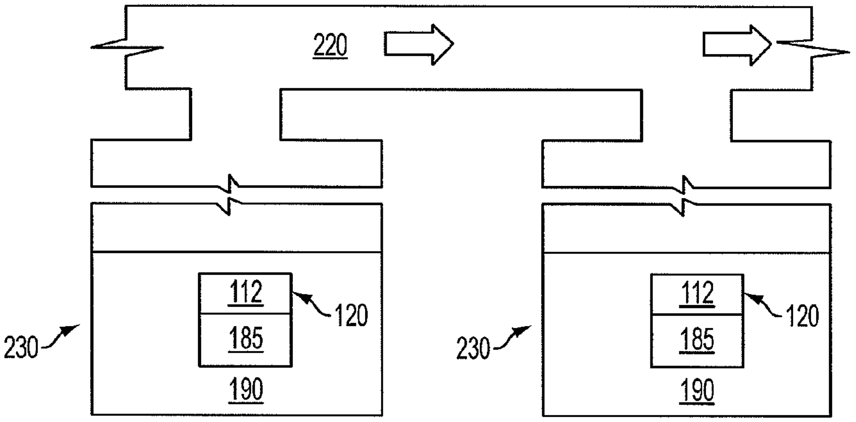
FIG. 7 is a front view of multiple canopy style hoods connected to a common exhaust in which respective vents of the hoods are controlled by shutter mechanisms according to an embodiment of the invention.

Referring now also to FIG. 7, in multiple hoods 230 linked to a common exhaust header 220 the flow control device 120 may be set to restrict flow more in those canopies 145 protecting lower loads and to restrict flow less in canopies 145 protecting higher loads. Further, real-time control, which is discussed later in the present specification, may be used to control each flow control device 120 according to an instantaneous load sensed by a smoke, temperature, image, and/or other sensor system as described below.

Figure 8:
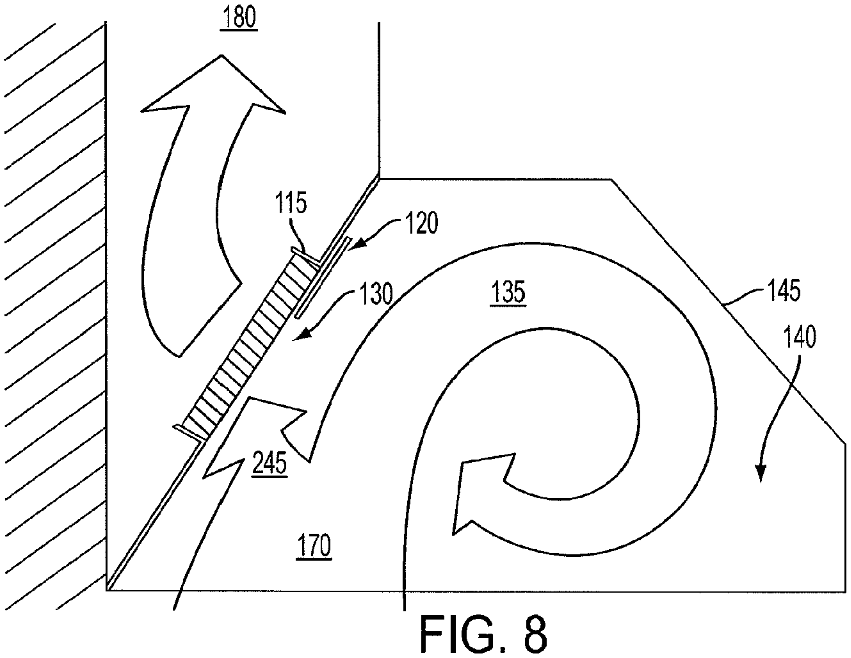
FIG. 8 is a sectional view of a canopy hood with a shutter according to another embodiment of the invention.

Referring to FIG. 8, the canopy recess 140 acts as a buffer to dampen the effects of temporal variability in the load. The thermal plume 170 rises at a rate that is faster than the mean rate of exhaust. In wall-type hoods as illustrated, the flow circulates within the canopy recess 140 dissipating its energy in a turbulent cascade whilst the plume 170 and room air 165, drawn by negative pressure created by the exhaust fan (not shown), are tapped from the canopy recess 140 as indicated figuratively by the arrow 245. The shape of the canopy recess 140 augments the vortical pattern by guiding it in a circular path as illustrated at 135. The vortical pattern may not be present in all hoods, but all hoods have some capacity to buffer temporal variability in the load whether a stable vortex is formed or not. More complex flow patterns may arise in other hoods, depending on the load, the hood shape and other variables.

Figure 9A:
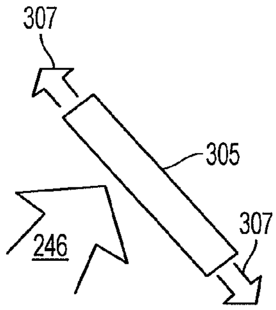
FIG. 9A is a side view of a centrifugal style cartridge filter used for grease extraction.
Figure 9B:
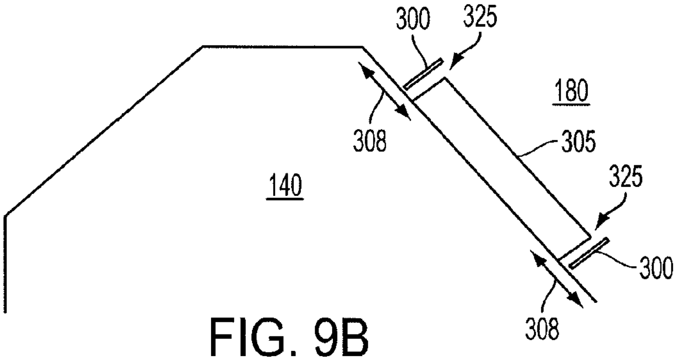
FIG. 9B is a sectional view of a canopy style hood with a flow control mechanism according to another embodiment of the invention.
Figure 10:
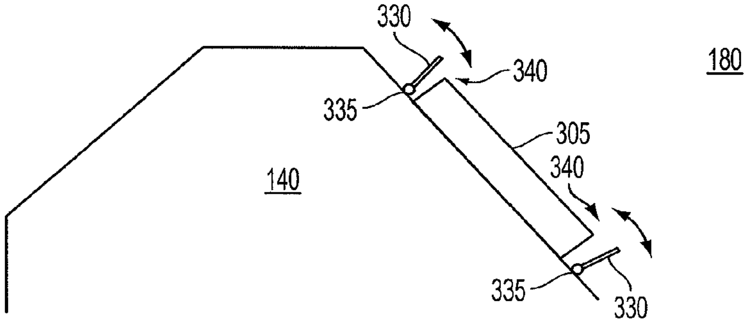
FIG. 10 is a side view of a canopy style hood with the flow control mechanism according to still another embodiment of the invention.

Referring now to FIGS. 9A, 9B, and 10, another type of flow control device provides variable control of the flow rate through certain types of filters 305. Referring momentarily to FIG. 9A in particular, in certain types of filters 305, the raw effluent stream enters as indicated at 246 and leaves at the ends of the filters as indicated at 307. Examples of this type of filter are described in U.S. Pat. No. 4,872,892, which is hereby incorporated by reference in its entirety as if fully set forth herein. Focusing now on FIG. 9B, the exit flows 307 are selectively blocked by movable plates 300 thereby providing a variable exit passage 325. In the embodiment of 9B, the plates 300 translate as indicated by arrows 308. In the embodiment of FIG. 10, movable plates 330 are pivotably mounted by hinges 335 and pivoted to provide variable exit passages 340.

Figure 11:
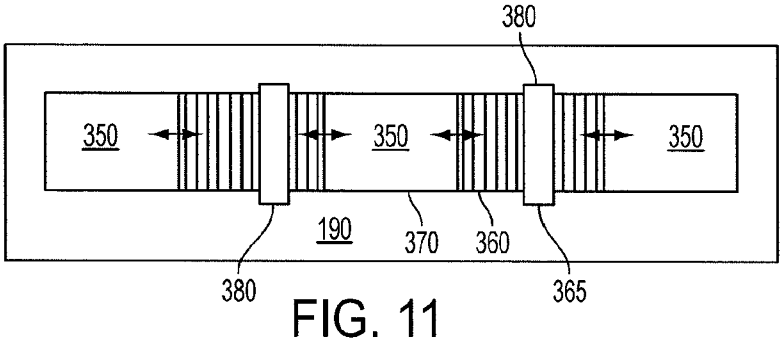
FIG. 11 is a front view of vents of a canopy hood or back shelf hood with rolling shutters according to yet another embodiment of the invention.
Figure 12:
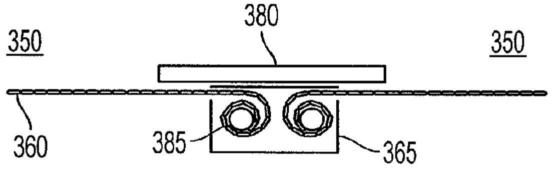
FIG. 12 is a sectional view of a rolling shutter mechanism according to an embodiment of the invention.

Referring now to FIGS. 11 and 12, another embodiment of a flow control device employs scroll shutters 360 that unroll from spools 385 inside a covered compartment 365. Each shutter 360 selectively blocks a vent 370 on the canopy recess side thereby providing a variable aperture 350 with respect to each vent 370. Each vent 370 may be separated by a partition portion 380 from one or two adjacent vents 370. Suitable guides and drive mechanisms are available from the field of movable shutters and may be employed in the present embodiment.

Figure 13:
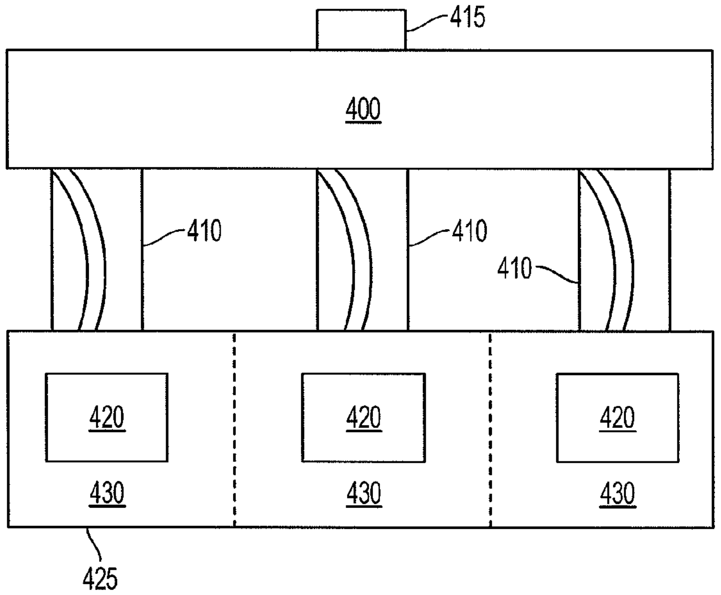
FIG. 13 is a partial sectional view of a long hood with multiple exhaust vents and corresponding flow throttling devices according to an embodiment of the invention.
Figure 14:
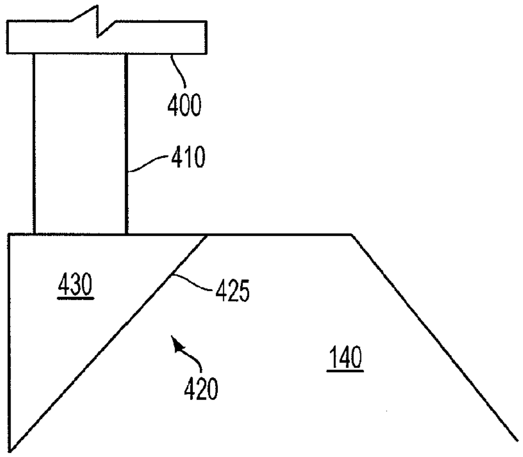
FIG. 14 is a sectional side view of the embodiment of FIG. 13.

Referring to FIGS. 13 and 14, a flow control device, such as described in U.S. Provisional Application No. 60/226,953, may be employed in a duct leading from the respective vents 420 of a single hood or from groups of vents in one or more hoods all linked to a common exhaust (not shown in this drawing). In the embodiment of FIGS. 13 and 14, a single hood is shown. A wall 425 of the recess has three vents 420 each leading to a respective plenum 430. Each plenum is connected to a duct containing a flow control device 410 having smooth walls, as described in the above referenced U.S. provisional application. Each flow control device 410 then leads to a common plenum 400 from which effluent is drawn through a common exhaust 415. By regulating each flow control device 410 separately, the flow through the respective vents 420 can be optimized as discussed above. A similar configuration may be used to balance respective hoods connected to a common exhaust.

Figure 15:
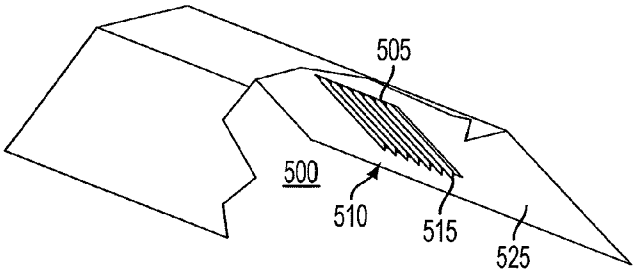
FIG. 15 is a perspective cut away of a shutter mechanism according to an embodiment of the invention.
Figure 16:
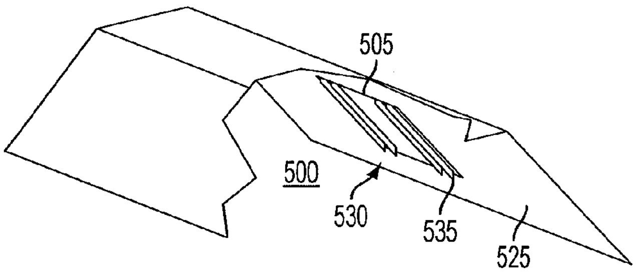
FIG. 16 is a perspective cut away of a shutter mechanism according to another embodiment of the invention.

Referring to FIG. 15, another type of flow control device 510 selectively blocks flow through a vent 505 (in a wall 525 of a canopy) using a vertical-blind type mechanism. Louvers 515 of the flow control device 510 pivot in a manner analogous to window blinds. The louvers 515 may be oriented with their pivot axes parallel to the tangent of the vortex 135 formed within a canopy recess 500. In this orientation, the louvers 515 generate less resistance to the vortical flow. To vary the flow through the flow control device 510, the louvers 515 are pivoted about their axes in concert to vary the net flow area through the vent 505 in the canopy wall 525. Referring to FIG. 16, in flow control device 530, which is similar to that of FIG. 15, louvers 535 are located over only a portion of the vent 505, since the flow may not need to be cut off 100%. Alternatively, the louvers 535 may be as in FIG. 15, but not close 100%.

Figure 17:
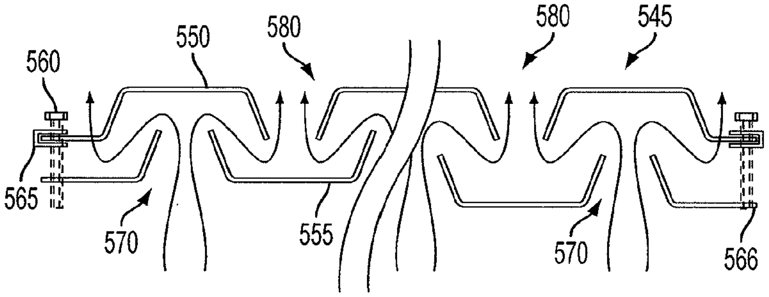
FIG. 17 is a sectional view of a combination filter/flow throttling device according to an embodiment of the invention.

Referring to FIG. 17, the structure of an impingement filter 545 is varied to modulate flow therethrough. The drawing shows a split view of a single filter in two configurations. On the left side of the drawing, the concave-back plates 550 and concave forward plates 555 are close together narrowing the flow passage between the inlets 570 and the outlets 580. In the right side of the drawing, the separation distance is increased thereby providing a larger flow passage with correspondingly less resistant to flow therethrough. The separation distance may be varied progressively or stepwise, depending on design choice, by any suitable mechanism.

In the example shown, adjustable standoffs are used to separate the plates 550 and 555. For example, the adjustable standoffs could be screws 560 with idle clips 565 that hold one end of the screws 560 at a fixed position along each screw's length and threaded holes 566 that traverse the lengths of the screws 560 when the screws are turned. The separation device may be automatic or manual, as required.

Figure 18:
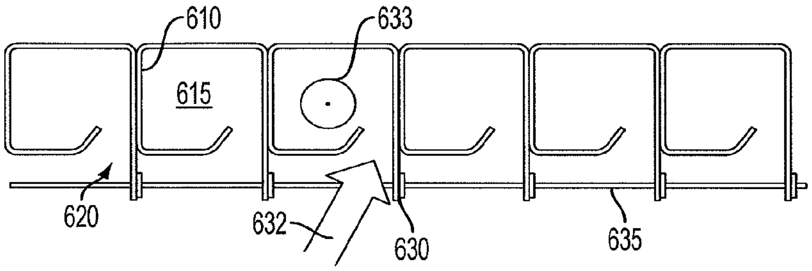
FIG. 18 is a sectional view of a combination filter/flow throttling device according to an embodiment of the invention.
Figure 19:
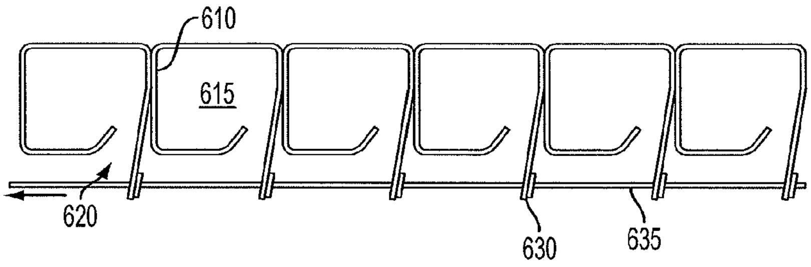
FIG. 19 is a sectional view of a combination filter/flow throttling device of FIG. 18 in a throttle-down position.
Figure 20:
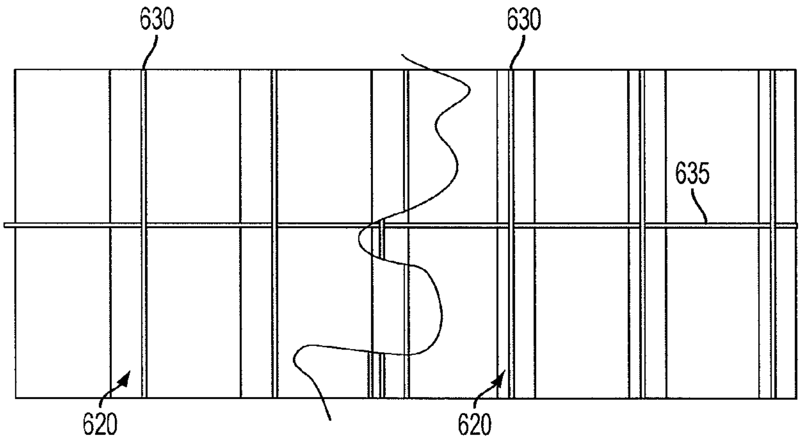
FIG. 20 is a face view of the filter of FIGS. 18 and 19 shown partly in a throttle-down position and partly in a throttle-up position.

Referring to FIGS. 18, 19, and 20, in a configuration of a grease filter of a type similar to those described in U.S. Pat. No. 4,872,892, modulation of the flow of exhaust through a vent of a range hood is afforded. In this embodiment, a filter is formed substantially as described in the above patent. That is, air flows into slots 620 along a face of the filter as indicated at 632 (all similar slots—only one is labeled) and exits through the ends of tubular sections 610 as indicated by the outward-facing-flow symbol 633. While travelling through each chamber tubular section 615, the flow swirls helically due to the tangential entry of the flow at each slot 620. The aperture of the slots 620 is varied by bending a flexible wall 630 of each slot by a gang pull-rod 635. When the gang pull-rod is moved as illustrated in FIG. 19, the flexible walls 630 bend narrowing the slots 620 and restricting the flow. FIG. 20 is a split view showing two configurations of the filter. The open configuration of FIG. 18 is illustrated on the left side of FIG. 20 and the narrowed configuration of FIG. 19 is illustrated on the right side of FIG. 20. The aperture 620 may be varied progressively or in steps.

Note that while in the embodiment of FIGS. 18-20 the flow area of the inlet slots 620 is varied by bending a wall that forms the tubular chambers 615, it is possible to accomplish a similar result by using a separate blocking plate with a hinge. That is, the wall 630 may be a separate element pivotably attached to the rest of the modules.

Figure 21A:
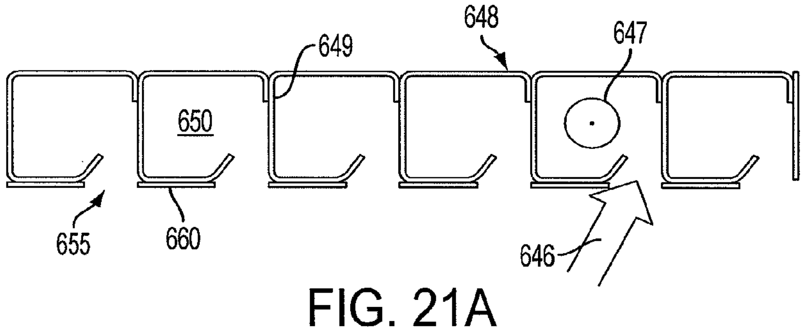
FIG. 21A is a sectional view of a combination filter/flow throttling device according to yet another embodiment of the invention.
Figure 21B:
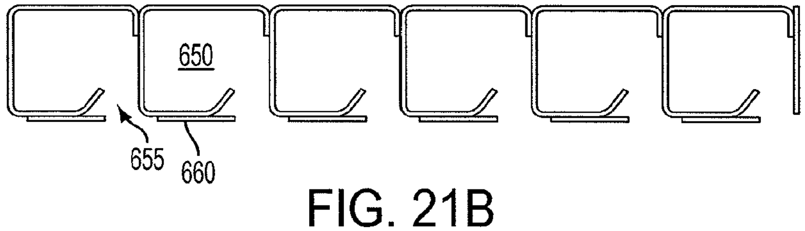
FIG. 21B is a sectional view of the filter/flow throttling device of FIG. 21A in the throttle-up position.
Figure 21C:
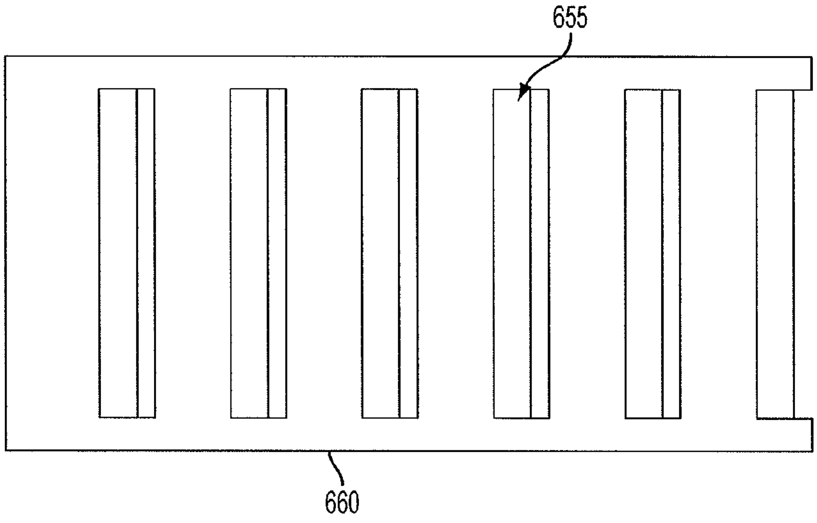
FIG. 21C is a front view of the filter of FIGS. 21A and 21B.

Referring to FIGS. 21A, 21B, and 21C, based on a filter design similar to that of U.S. Pat. No. 4,872,892, flow entering the filter is selectively blocked by a movable shutter plate 660. Each tubular chamber 650 receives air through a respective slot-shaped flow aperture 655 and delivers it through ends 649 of each of the plurality of modules 648 as indicated by the arrows 646 and 647, respectively. When the shutter plate 660 is in a relatively open position as shown in FIG. 21A, each flow aperture 655 is relatively large in area. When the shutter plate 660 is in a relatively closed position as shown in FIG. 21B, the flow aperture 655 is relatively small in area. Thus, the shutter plate 660 position may be used to control the pressure drop across the filter and consequently the flow rate across the filter.

All of the filters that are able to control flow may be used for hood balancing. If each filter is controlled independently, the flow rate through each vent of one or more hoods can be controlled independently. Each filter may be controlled in each hood of a system to flow-balance longer hoods and to balance hoods against each other. Alternatively, a single filter of a hood with multiple vents can be controlled leaving the other filters uncontrolled. This may allow the balancing of the entire hood against other hoods. In a longer hood, this solution may be less desirable because it would vary the exhaust rate across the length of the hood, which may produce inefficiencies as discussed above.

Figure 22A:
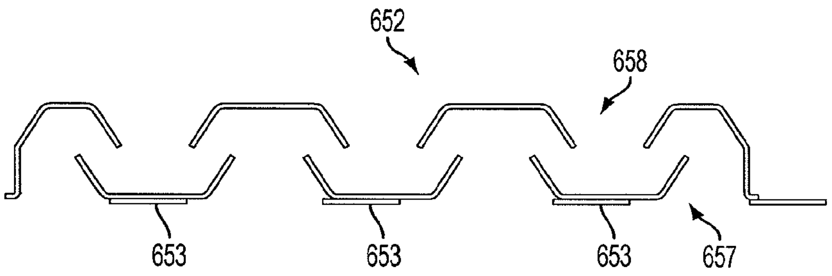
FIG. 22A is a section view of a filter/flow throttling device according to another embodiment of the invention.
Figure 22B:
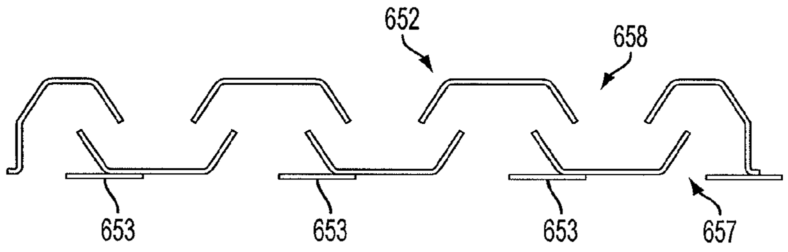
FIG. 22B is a sectional view of the filter of FIG. 22A in a throttle-down position.
Figure 22C:
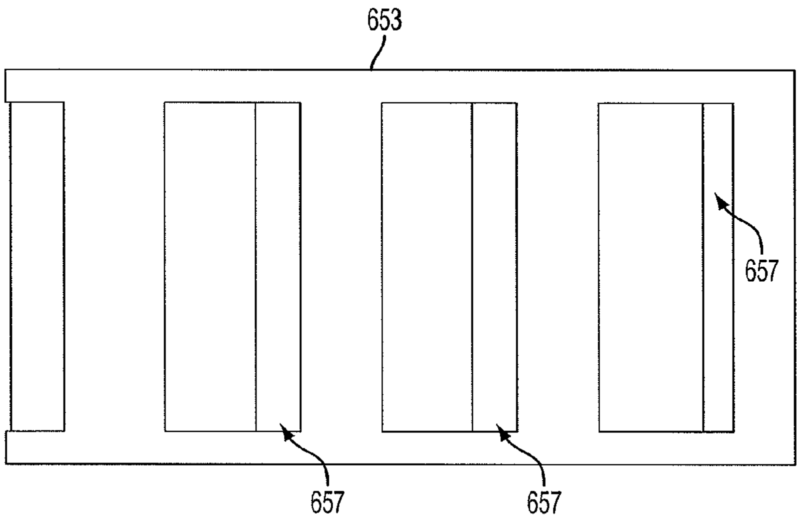
FIG. 22C is a front view of the filter of FIGS. 22A and 22B.

Referring to FIGS. 22A, 22B, and 22C, based on a more conventional type of filter cartridge known as an impingement filter 652 (also discussed above), a shutter plate 653 is moved to vary the size of flow apertures 657. Effluent flows from the inlet flow apertures 657 to respective outlets 658. The selective variation of the flow apertures 657 varies the pressure drop through the flow apertures 657. Note that although in this embodiment, a shutter plate 653 is used to selectively block the aperture 657, it is clearly possible to use a shutter plate to selectively block the outlets 658 or both to achieve the same effect.

Figure 23A:
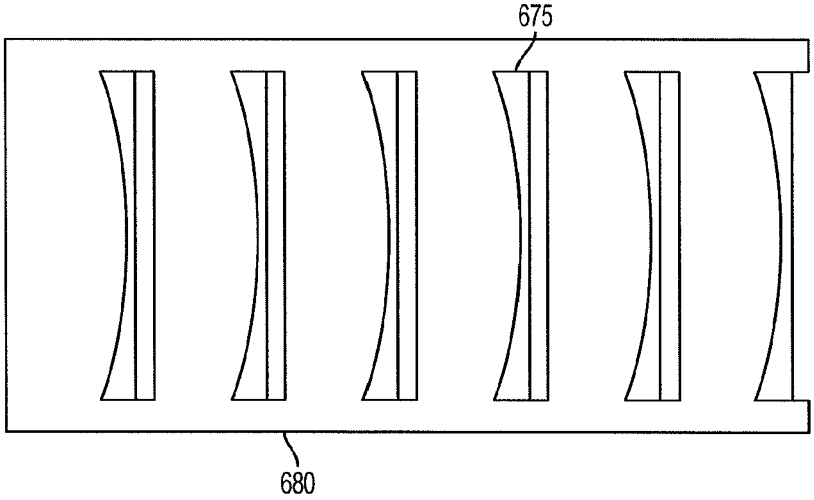
FIG. 23A is an alternative embodiment of the device of FIGS. 22A-22C.
Figure 23B:
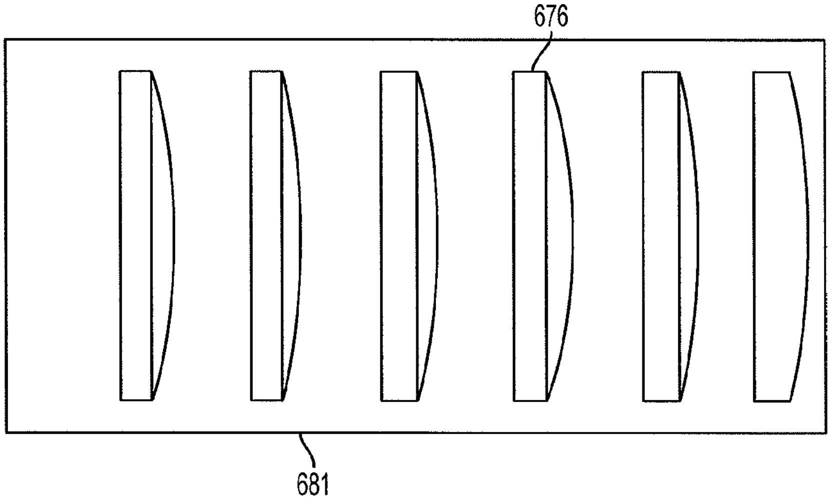
FIG. 23B is another alternative embodiment of the device of FIGS. 22A-22C.

The shutter plate of FIGS. 21A-C and 22A-C are illustrated as having rectangular openings. Referring to FIGS. 23A and 23B, it is possible to employ other shapes to good effect. For example, in the embodiment of FIG. 23A, a shutter plate 680 has openings 675 with a curved border such that access to the middle section of the filter is blocked more than the ends. In the embodiment of FIG. 23B, the opposite is true. In the latter embodiment, a shutter plate 681 has openings 676 with a curved border such that access to the end sections is blocked more than the middle section. Either embodiment may be used with either type of filter cartridge or others not described herein, but the embodiment of FIG. 23B may be more favorable in a filter such as described in U.S. Pat. No. 4,872,892 because it favors a longer travel path of the air along the flow modules providing greater grease separation in the process.

Figure 24A:
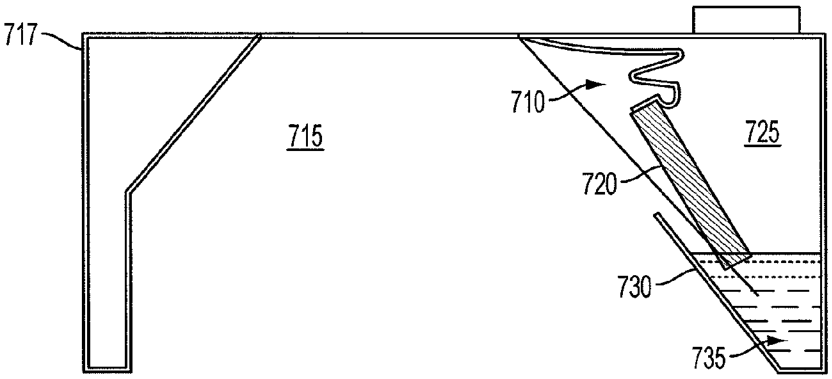
FIG. 24A a sectional view of a canopy hood with a flow throttling device including a cleaning fluid according to an embodiment of the invention.
Figure 24B:
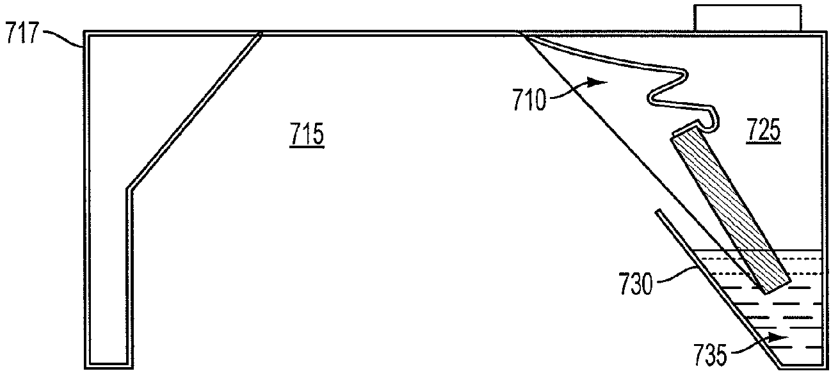
FIG. 24B is a sectional view of the flow throttling device of FIG. 24A in the throttle-down position.

Referring to FIGS. 24A and 24B, a canopy 717 has a recess 715 bounded, in part, by a flexible accordion wall 710, a filter 720, and a water tank 730. The filter 720 is partly immersed in a pool of water or other liquid 735, held by the tank 730. The exposed face of the filter is limited by the immersion of part of the filter 720 in the pool of water 735 and thus the flow area is reduced. As a result, the flow area may be modulated by varying how deeply the filter 720 is immersed. By varying this flow area, the pressure drop between the recess 715 and a plenum 725 may be selectively varied to vary the exhaust flow. To vary the depth of immersion, the filter 720 may be translated. The flexible accordion wall 710 flexes to follow the filter 720. The flexible accordion wall 710 may be made of steel or some other material. The filter may be held by a suitable engagement device (not shown) at the distal end of the flexible accordion wall 710. Cleaning solution may be used in the tank 730. During shutdown of the exhaust system, the filter 720 may be immersed more completely in the cleaning solution to clean the filter 720.

Figure 24C:
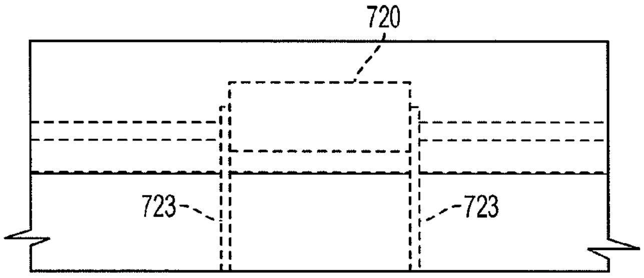
FIG. 24C is a top view of the embodiments of FIGS. 24A and 24B.

Referring now also to FIG. 24C, seal plates 723 prevent effluent gases from bypassing the filter 720 by going around it. The seal plates may extend from the top of the accordion wall 710 to the level of the liquid 735.

Figure 25A:
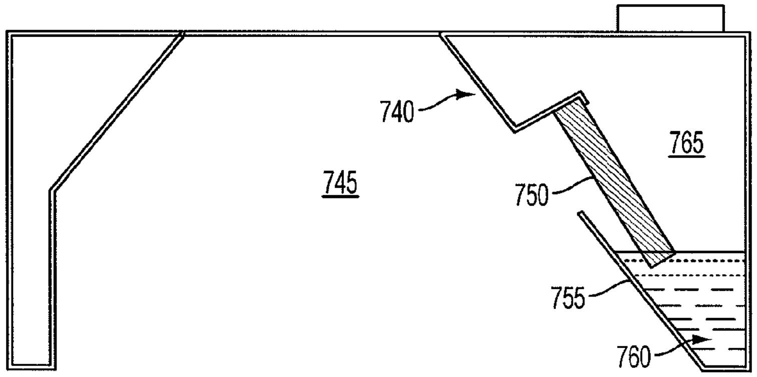
FIG. 25A is a sectional view of a flow throttling device using a cleaning fluid according to an embodiment of the invention.
Figure 25B:
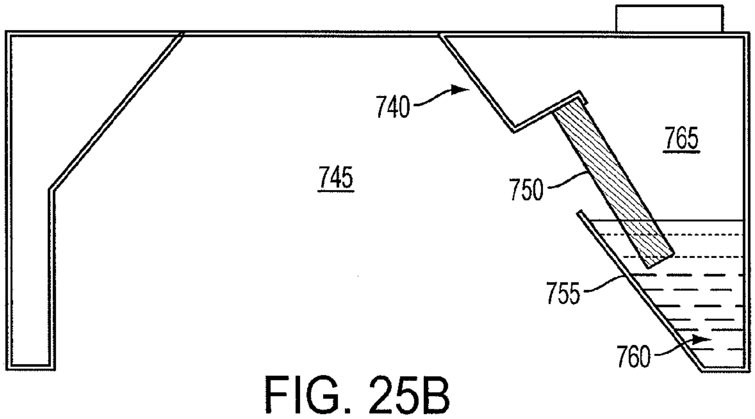
FIG. 25B is a sectional view of the flow throttling device of FIG. 25A in a throttle-down position.

In another embodiment, a recess 745 is bounded in part by a fixed wall section 740 to which a filter 750 is connected at a distal end thereof, as shown in FIGS. 25A and 25B. Seal plates (not shown) may be provided as in the embodiment of FIGS. 24A-24C. The filter 750 is immersed partly in a tank 755 filled with water or a cleaning solution or some other liquid 760. The pressure drop between a suction-side plenum 765 and the recess 745 across the filter 750 is governed by the level of the liquid 760 in the tank 755, which in turn controls the flow area available through the filter. In FIG. 25A, the flow area is greater than the illustration of FIG. 25B because the liquid 760 level is higher in FIG. 25B.

Figure 26:
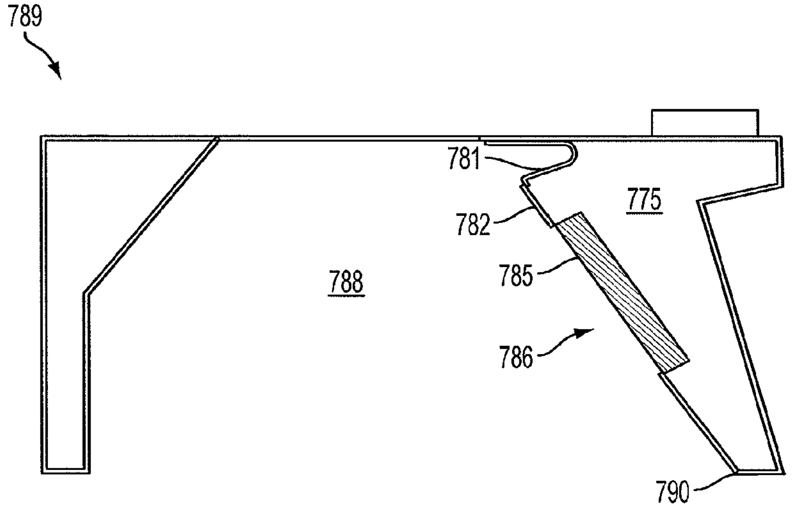
FIG. 26 is a sectional view of a canopy hood showing a flow throttling device according to embodiment of the invention.
Figure 27:
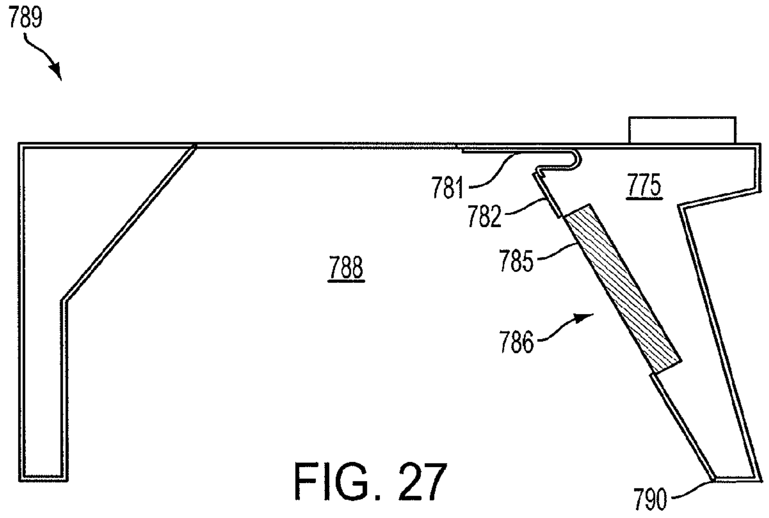
FIG. 27 is a sectional view of the embodiment of FIG. 26 in a throttle-down position.

Referring now to FIGS. 26 and 27, a recess 788 of an exhaust hood 789 is defined in part by a pivoting wall 782 that pivots at one end 790 and is connected by a flexible wall 781 at another end. The pivoting wall 782 also defines in part a suction side plenum 775 whose flow passage is reduced in flow area by the change in the angle of pivot of the pivoting wall 782. The flow through the filter 785 in each controlled vent 786 may be modulated by means of an independent apparatus as shown. Thus, for balancing flow through a single hood, two or more sets ("sets" may be single in number) of vents may lead into separately controlled plenums 775.

Figure 28A:
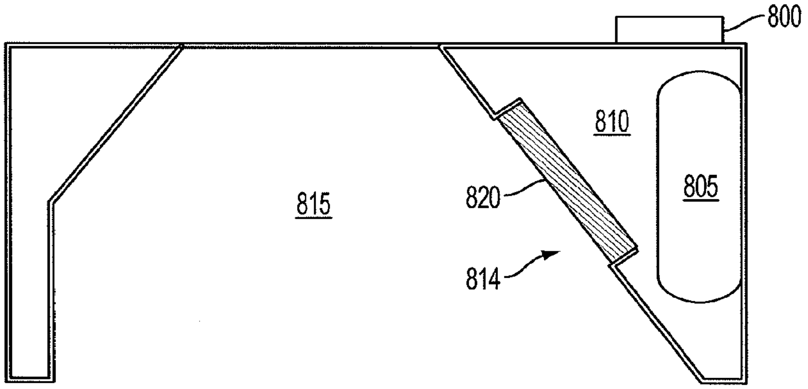
FIG. 28A is a sectional view of a canopy hood showing a flow throttling device employing an expandable bladder according to an embodiment of the invention.
Figure 28B:
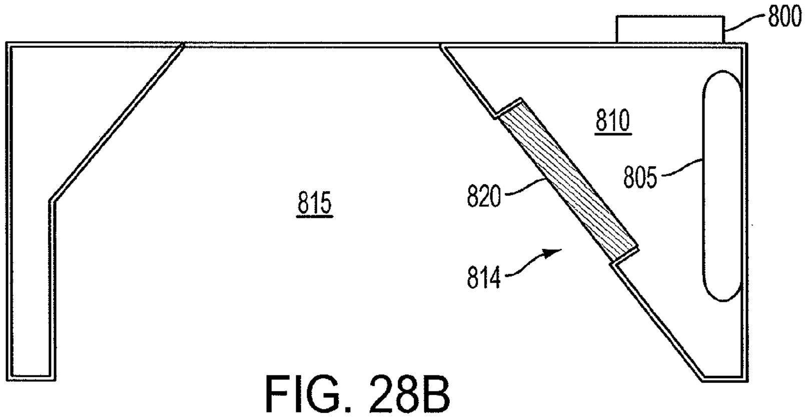
FIG. 28B is a sectional view of the flow throttling device of FIG. 28A in a throttle-down position.
Figure 29:
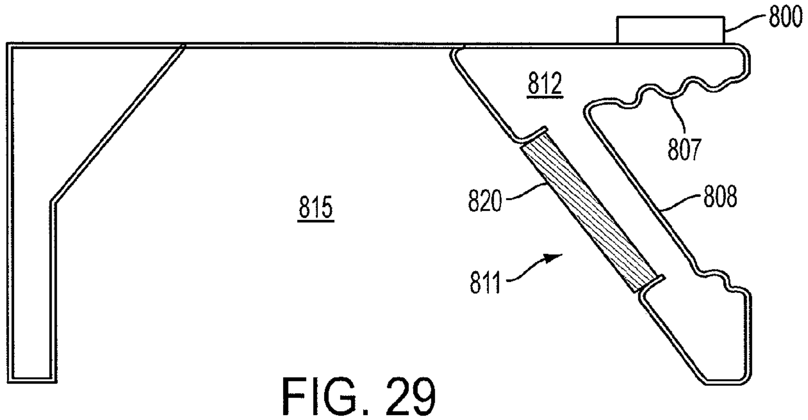
FIG. 29 is a sectional view of a canopy hood with a flow throttling device employing a flexible back wall of a plenum according to an embodiment of the invention.

Referring to FIGS. 28A and 28B, a hood canopy, having a recess 815, has a plenum 810 that receives exhaust air through a filter 820. The pressure drop through the plenum 810 is modulated by varying the configuration of an obstruction 805. The obstruction may, for example, be an inflatable bladder. The obstruction may be made of steel with an accordion type bellow integral thereto to permit its volume to vary. Alternatively, it may be of polymeric material or other suitable construction. The obstruction 805 is shown with a substantially pillow shape, but it is understood that it could have any shape. A shape that presents a face that is substantially parallel to the exit face of the filter 820 would be better than one that is at a substantial angle as shown so as not to favor one portion of the filter over another. Referring to FIG. 29, in a variation of the embodiments of FIGS. 28A and 28B, wall of the plenum 812 has a face 808 and accordion ribbing 807 to permit the face 808 to be pushed into the plenum 812 to vary the flow channel area and thereby the pressure drop through the plenum. The same effect would be accomplished with an obstruction as in FIGS. 28A and 28B. That is, the face angled as face 808 could be formed in the obstruction 805.

In the embodiments of FIGS. 28A, 28B, and 29 separate plenums 810/812 may be provided for each modulated vent 814/811. Alternatively, however, because the flow obstructor 805/808 may be made local to a respective vent 814/811, all vents may share a common plenum 810/812 for a single hood while still providing the ability to balance a single long hood. That is, a separate and independently controllable flow obstructor 805/808 may be made respective to each vent 814/811 to control each vent independently of the others.

Figure 30:
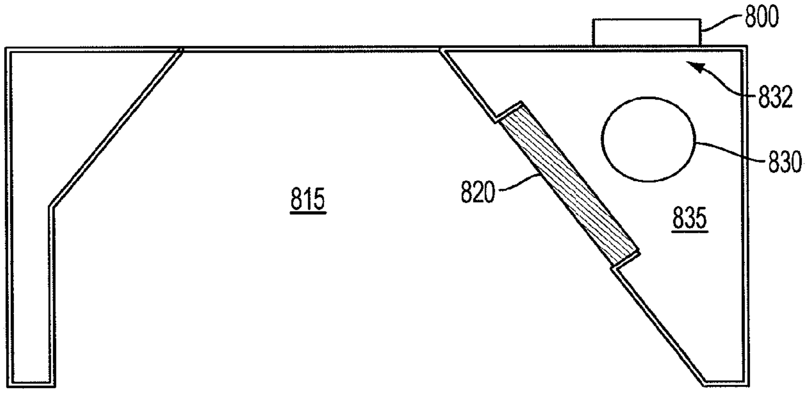
FIG. 30 is a sectional view of a canopy hood with a flow throttling device using a ball bowel arrangement according to an embodiment of the invention.
Figure 31:
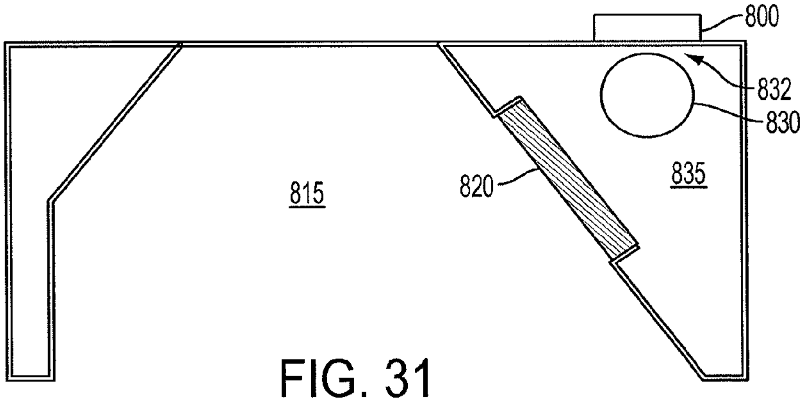
FIG. 31 is a sectional view of a canopy hood with the flow throttling device of FIG. 30 in a throttle-down position.
Figure 32A:
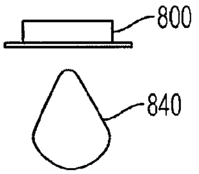
FIGS. 32A and 32B are side views of alternative bowel arrangements suitable for use in the embodiment of FIGS. 30 and 31.
Figure 32B:
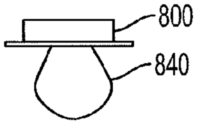

Referring to FIGS. 30 and 31, a hood of substantially standard construction has a suction side plenum 835 which draws air through a filter 820. An aperture 832 leads to an exhaust collar 800. The aperture 832 is selectively blocked by a smooth obstruction 830 whose distance from the aperture 832 determines the flow area for exhaust flow through the aperture. In an embodiment, the flow obstruction 830 is in the shape of a sphere. Referring to FIGS. 32A and 32B, an alternative shape for a flow obstruction 840 is a water-drop shape. For rectangular flow apertures, other shapes may be used. Preferably, the shape of the flow obstruction is smooth so as not to generate stable and quasi-stable or periodic flow structures that result in undue precipitation of aerosols.

Figure 33:
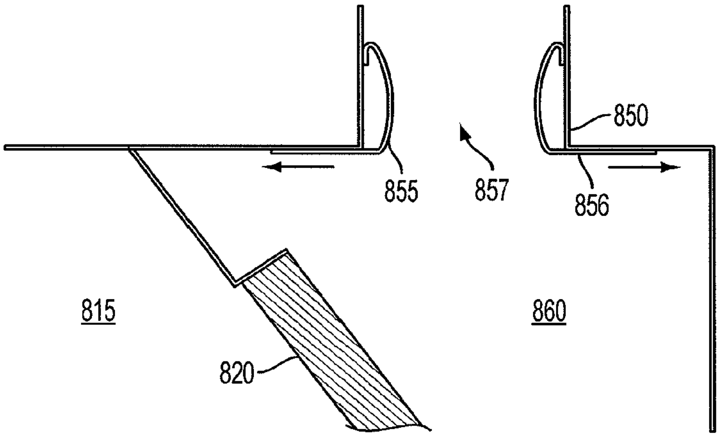
FIG. 33 is a sectional view of a flow throttling device for a hood in a throttle-up position according to an embodiment of the invention.
Figure 34:
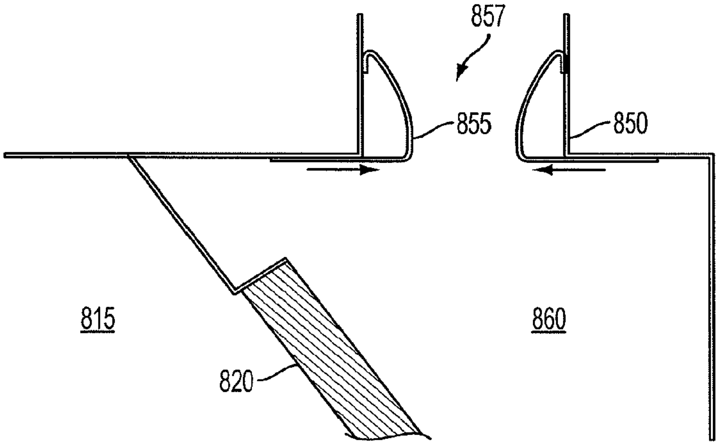
FIG. 34 is a sectional view of the flow throttling device of FIG. 33 in a throttle-down position.

Referring to FIGS. 33 and 34, in a rectangular exhaust collar 850 fed from a suction side plenum 860 of an exhaust hood, flexible smooth flow obstructor plates 855 are provided. By varying the shape and area of a flow channel 857, the pressure drop across the flow channel 857 is modulated providing the ability to balance suction side plenums 860 selectively. The shapes of the obstructor plates 855 may be varied by translating tongue segments 856 accordingly. The final actuator used to vary the shape and size of the flow channel 857 may be any suitable device. Note that one side only may be translated rather than both as indicated.

Figure 35:
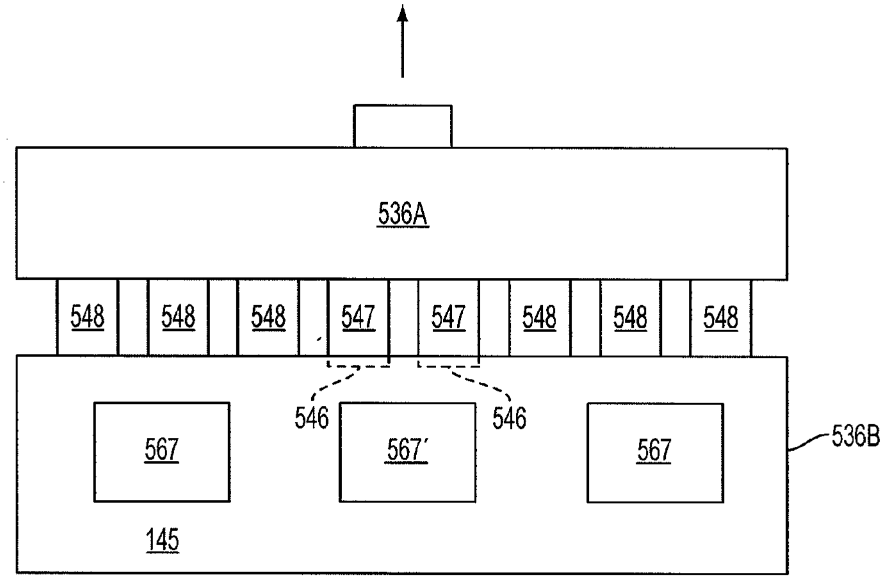
FIG. 35 is a front view of a long hood with multiple vents and multiple duct sections which may be selectively blocked according to an embodiment of the invention.
Figure 36:
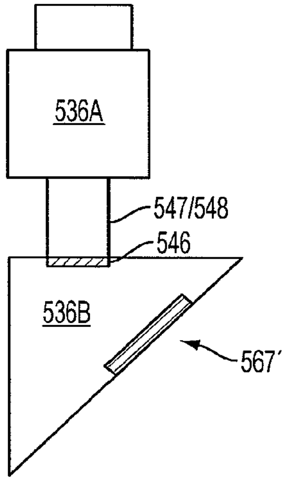
FIG. 36 is a sectional side view of the embodiment of FIG. 35.

Referring to FIGS. 35 and 36, an exhaust hood has a suction side plenum divided into an upper part 536A and a lower part 536B. The upper part 536A and lower part 536B are connected by a series of duct sections 547/548 that may be selectively covered with blanks 546 to vary the flow through each respective vent 567. In the example situation shown in FIG. 35, two of the middle-most blanks are set to block flow through ducts 547 and permit free flow through ducts 548. By selectively blocking some ducts 547 and permitting flow through other ducts 548, the relative flow through the vents 567 is altered. For example, the flow through vent 567' would be reduced relative to the flow through adjacent vents 567 because of the presence of the blanks 546. Since no obstructions are added to a flow path, no mechanism is introduced that would cause undue precipitation.

Note that while in the embodiment of FIGS. 35 and 36, the blanks 546 are fixed in place, it would be possible to arrange for the blanks 546 to be selectively moved into place to provide real-time modulation of flow. Thus, in this embodiment, a movable blank 546 would either be in place blocking flow through a respective duct section 547 or it would be out of the way permitting free flow through the respective duct section 548. Also, while in the embodiment described above, it was presumed that the configuration of the lower plenum 536B was such that flow through the middle vent 567' would be appreciably reduced relative to that through the other vents 567, the latter plenum may be sufficiently generously sized such that the only effect of reducing the aggregate flow area by blocking ducts 547 may be to reduce the total flow for the entire hood without redistributing the flow along the hood. Thus, this design may be used to balance multiple hoods or single hoods, as may all the previous embodiments. The advantage of using this technique rather than a single flow control, however, is that it does not create any obstruction around which fumes and air must flow. Thus, it avoids the attending precipitation problems.

Figure 37:
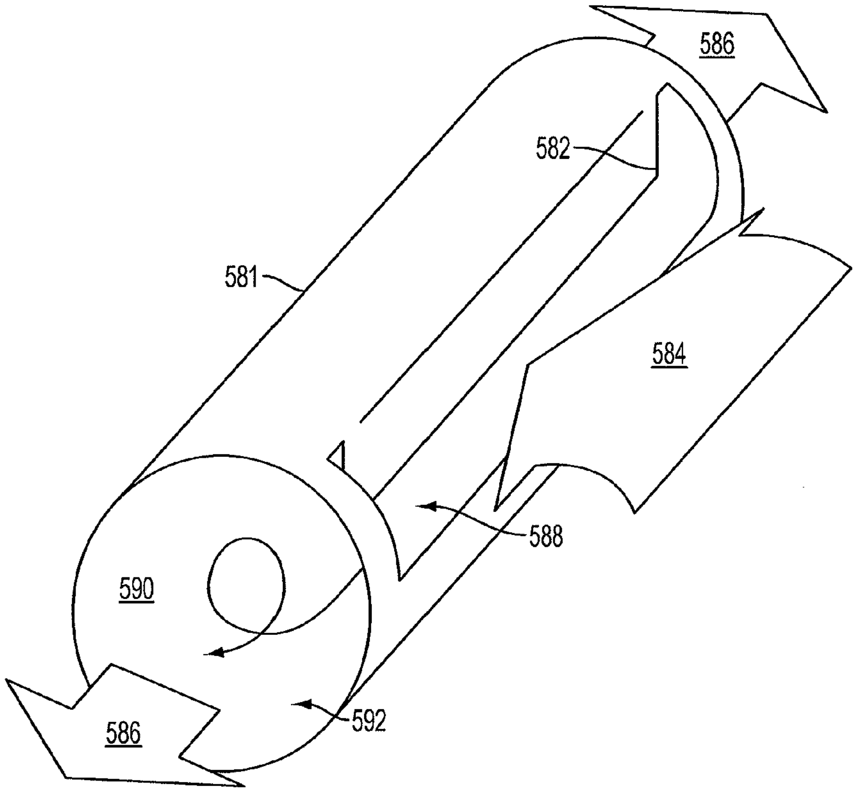
FIG. 37 is a perspective view of a cylindrical module of a combination filter/flow throttling device according to an embodiment of the invention.

Referring to FIG. 37, a cylindrical grease filter module 581 has an inlet 588 through which raw effluent and air are drawn and an outlet 592 from which the cleansed air is extracted. A guide vane 582 causes an incoming stream 584 to be directed into a helical flow 590 so that grease and other airborne particulates precipitate on the interior walls of module 581. The exit flow 586 is directed at approximately a right angle to the incoming stream 584. Functionally, the cylindrical grease filter module is similar to that of the filters described in U.S. Pat. No. 4,872,892. However, the cylindrical walls of module 581 may provide lower resistance and improved cyclonic flow therewithin.

Figure 38:
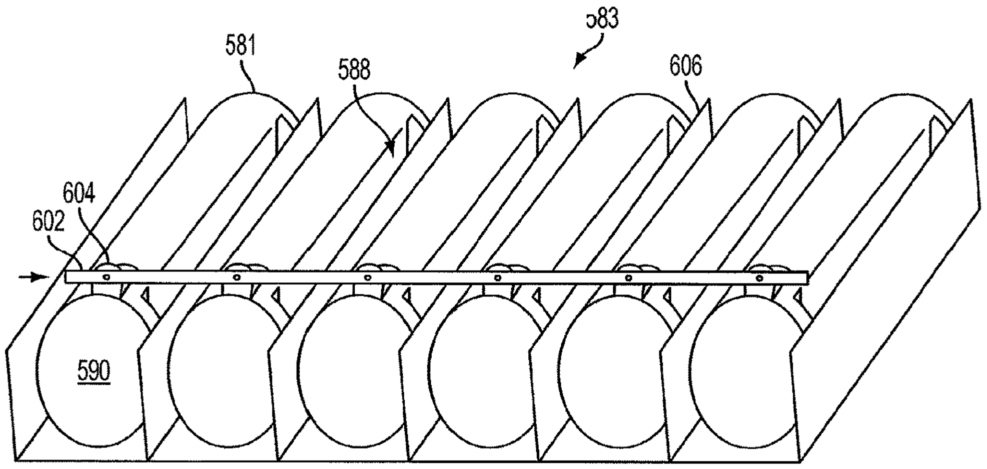
FIG. 38 is a perspective view of a combination filter/flow throttling device employing the module of FIG. 37 and a rotating assembly.
Figure 39:
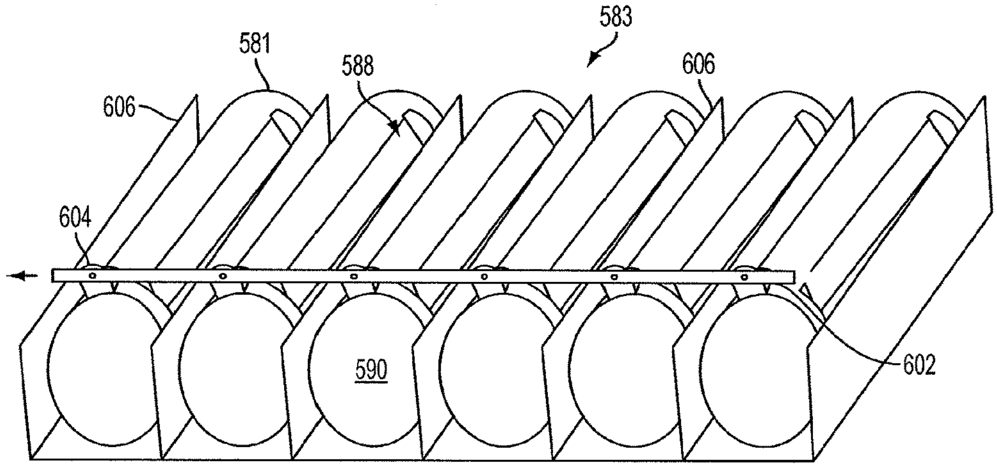
FIG. 39 is a perspective view of the embodiment of FIG. 38 in a throttle-up position.

Referring to FIGS. 38 and 39, a filter cartridge 583 is formed from multiple cylindrical grease filter modules 581. Each cylindrical grease filter module has a lever tab 604 which is tied to a rotator bar 602 which is used to rotate the cylindrical grease filter modules 581 in concert. By rotating the cylindrical grease filter modules 581, the exposed area of the inlet 588 of each cylindrical grease filter module 581 is selectively altered. When the cylindrical grease filter modules 581 are in the positions shown in FIG. 38 the flow through the filter cartridge 583 is restricted more than when they are in the positions shown in FIG. 39. This is because the inlets 588 are increasingly blocked by partitions 606 as the cylindrical grease filter modules 581 rotate clockwise. Note that in an alternative embodiment, the cylindrical grease filter modules 581 may be set immediately adjacent to each other and the blocking function of the partition plate formed by the external surfaces of adjacent cylindrical grease filter modules 581. In this way, the partition plates 606 may be avoided.

Figure 40:
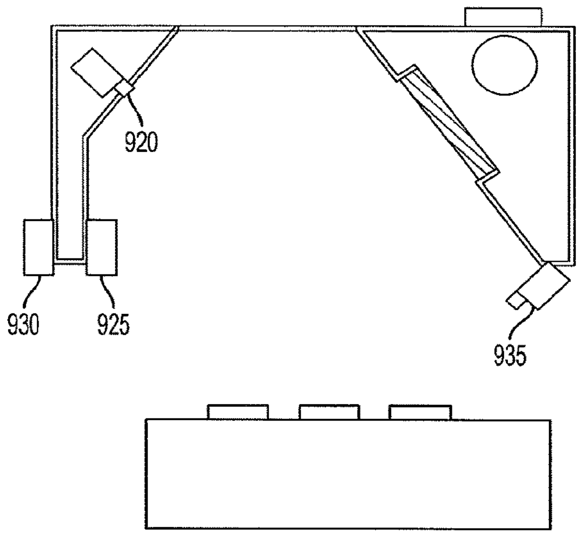
FIG. 40 is a sectional view of a canopy style hood with sensors to gather data about cooking conditions.
Figure 41:
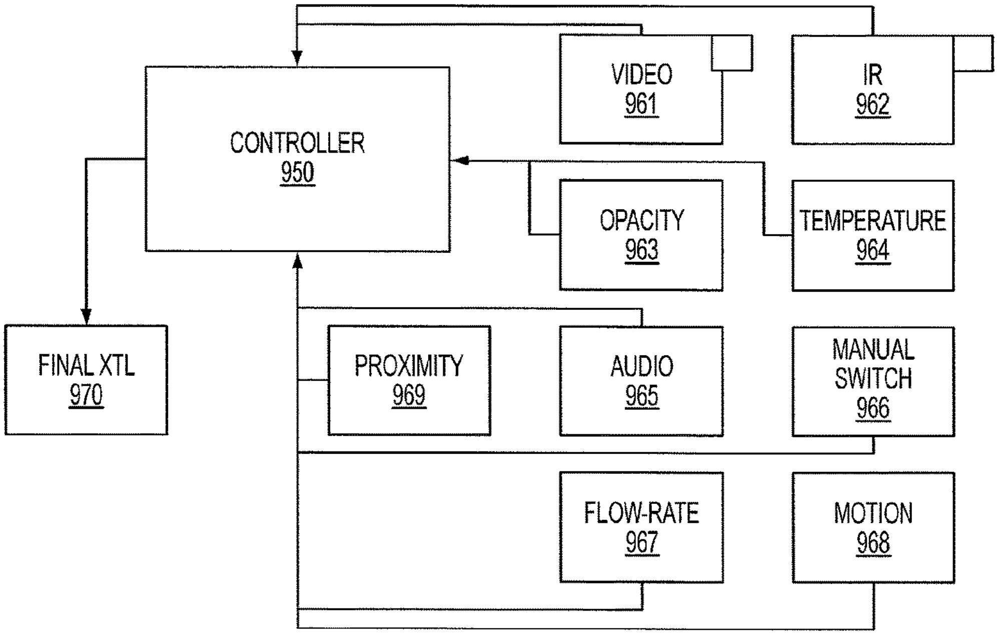
FIG. 41 is a block diagram of the controller with sensors for controlling the balance of one or more kitchen exhaust hoods.

Referring to FIGS. 40 and 41, various sensor mechanisms may be used to provide real time control of the flow rate through one or more hoods. For example, a controller 950 may receive input signals from one or more input devices including one or more video cameras 961, infrared video cameras 962, opacity sensors 963, temperature sensors 964, audio transducers 965 (e.g., microphones), manual switches 966, flow rate sensors 967, motion sensors 968, and proximity sensors 969. Based on one or more of these inputs signals the controller may control the setting of one or more output controllers 970 connected to any of the flow control devices described previously or described later in the present specification. Video or IR cameras may be located at any desired position, examples being indicated at 920 and 935 and as discussed later in connection with FIG. 42. Opacity and temperature sensors may be located at any positions, two examples being indicated at 925/930.

The technology in image processing is more than adequate to detect a change in a volume of smoke or heat resulting from an increased cooking load. Optical and/or infrared images may be captured and a cooking load indicator derived therefrom. For example, an IR image processing algorithm that simply indicates the percentage of the field of view that is above a temperature threshold may thereby indicate escape of a thermal plume from a hood; i.e., a loss of capture and containment due to the thermal plume rising in front of the external edge of the hood. As such a loss of containment is approached, the hot buffer zone tends to grow from deep within the recess until it breaches the capture zone. This growth of the buffer zone can be indicated in precisely the same way: by imaging a predefined field of view and recognizing the size and/or shape of the hot zone (the latter being defined as a zone in which the imaged temperature exceeds a predefined threshold). This is discussed further below.

The movement of a worker, the image of the food being cooked, the presence of smoke at particular locations (such as escape of containment at the edge of the hood), the temperature of air near the hood or within the canopy recess, the proximity of a worker, etc. may all be combined to form a classification input-vector from which a condition (e.g., percentage of full-load) classification may be derived. Algorithmic, rule-based methods may be used. Bayesian networks or neural network techniques may be used. Alternatively, just one sensory indicator of load may be used to determine the current load. For example, a gas flow rate sensor for a gas grill could provide the single input signal. Many possibilities are available with current sensor, machine-classification, and control technologies.

Figure 42:
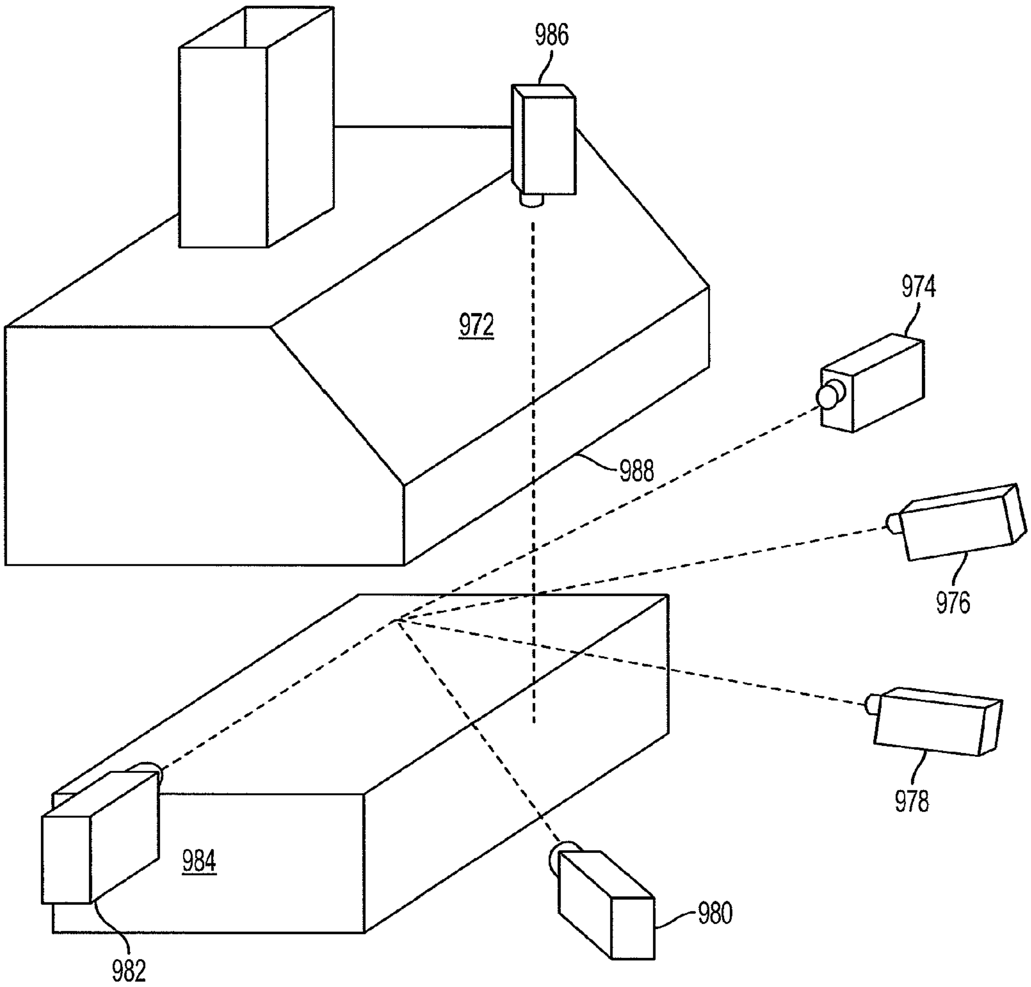
FIG. 42 is a perspective view of a cooking appliance and hood showing various camera angles.
Figure 43A:
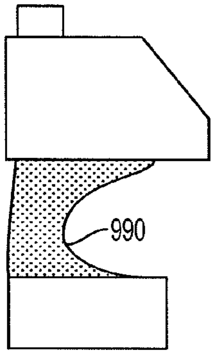
FIG. 43A is a side view of a hood and cooking appliance with a plume in which the exhaust rate is higher than necessary.
Figure 43B:
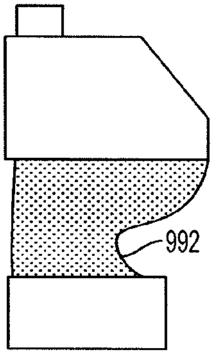
FIG. 43B is a side view of a hood and cooking appliance with a plume in which the exhaust rate is set at an optimal rate.
Figure 43C:
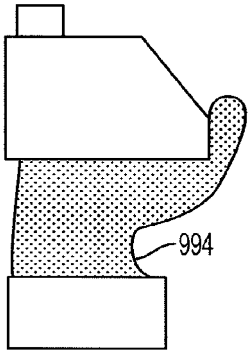
FIG. 43C is a side view of a hood and cooking appliance with a plume in which the exhaust rate is set too low.

Referring to FIG. 42, various camera angles may be employed in a load-classifier that employs optical or IR images. For example, a camera 982 is positioned to image a side view of a canopy 972, range 984, and a work area between and to adjacent them. Referring also to FIGS. 43A-43C and 44, when camera 982 is an IR-based camera, this side view can image a hot zone whose size and shape are dependent on effluent load (which includes heat) and exhaust rate. FIG. 45 is a Schlerian image, but the shape of the hot plume in the figure is essentially the same as that provided by a thermal camera. As the exhaust rate falls below that necessary to provide capture and containment, a hot zone image provided by the camera 982 would expand progressively as illustrated in the series of FIGS. 43A-43C. The hot zone changes from one associated with adequate capture and containment 990, to one on the verge of breaching 992, to one where capture and containment has been lost 994. The changes in the images, the rate of change of images, and the history of changes in the images may be employed in a control system as described to insure that capture and containment is maintained.

Figure 44:
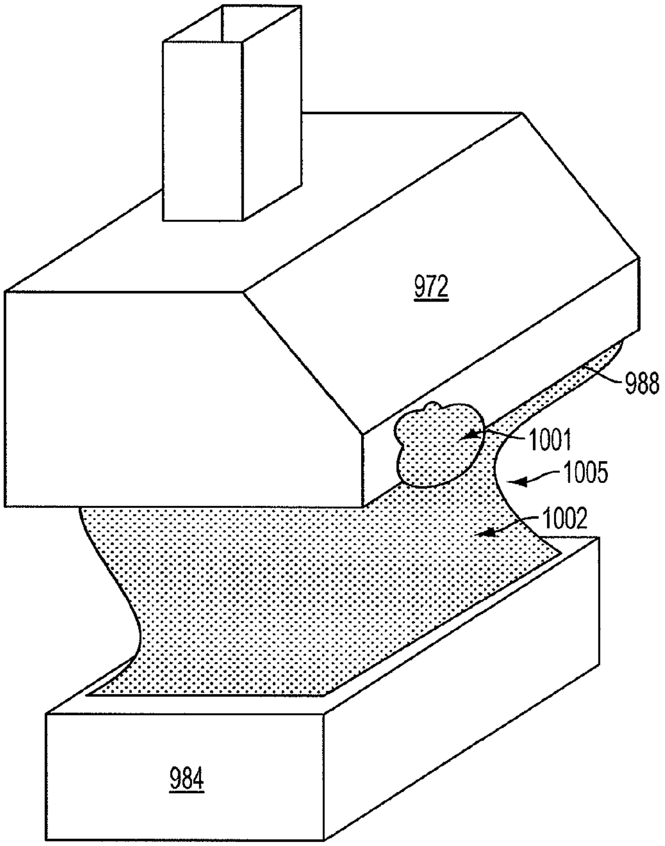
FIG. 44 is a perspective view of a canopy hood and cooking appliance showing a plume escaping containment.
Figure 45:
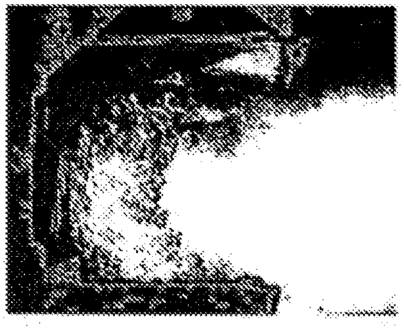
FIG. 45 is a Schlerian photograph of the thermal plume rising from a cooking appliance into a canopy hood.

Referring now to FIG. 44, other camera angle views such as provided by camera 980 may provide more information about the particular location of the exhaust rate deficit along the canopy edge. Illustrated in FIG. 44 is an oblique view of a canopy and plume 1002 showing a spillover 1001 over an edge 988 near an end of the canopy 972. This image may be used to provide an adjustment to exhaust flow rate favoring the portion of the canopy 972 close to an end thereof, as illustrated. The ability to detect spillover and its position along the edge 988 may be obtained by positioning a camera 986 looking downwardly so that it captures the entire front edge 988. By taking multiple images, such as provided by cameras 974, 976, 978, 980, 982, and 986, it is possible to compare the shape of the three dimensional plume to determine an imminent spill. Thermal plumes have a characteristic waist 1005 that results from the increase in velocity and the draw of cooler air as they rise. This waist begins to bulge at the top as capture competency is lost. Again, the spillover can be detected as a three-dimensional model based on temperature or opacity.

The model or two-dimensional image(s) may be graded or thresholded. The image resolution need not be high since the structures are highly repeatable and their variability quite distinct. Thus, a relatively inexpensive imaging device may be employed with a small number of pixels. The classification process must include unrecognized classes and be capable of indicating the same. For example, if the view of a camera is occasionally obstructed, the imaging and classification process should be capable of recognizing the absence of an expected image and responding to it. Images that change suddenly or do not belong to a recognized plume shape may be classified as a bad image. A response to a bad image may be ignoring the bad image or ramping the exhaust rate to a design maximum until a recognized image is acquired again. Fiducial marks or particular features of the exhaust or cooking equipment may be employed to help determine if the camera view is obstructed. The lack of such features or fiducials in the image may indicate the loss of the image.

Activity can be indicated by live camera images, IR and optical. For example, the presence of an operator near the working area of a cooking appliance may be used as a signal indicating that the cooking load is increased. The particular activities in which the operator is engaged are likely to be highly repeatable events and readily classifiable by video classification methods as a result. For example, a particular stage of cooking may be characterized by the laying out of many pieces of meat on a hot grill. The movement of a worker's arms over the hot grill placing the meat is an activity that may be readily classified since it has distinct characteristics that distinguish it from other background activities such as cleaning or walking around the grill. Classifying the event of placing the meat on a grill may trigger a timer to anticipate when the load reaches a maximum.

Neural networks may be trained to classify the conditions in a kitchen using neural network techniques. The inputs from multiple devices may be combined to form a vector. The following are possible vectors.

1. Cameras a) Thresholded image is an image reduced to 1-bit map such that all temperatures (radiative) or light levels above a threshold are one color and all temperatures or light levels another color. Process image to identify contiguous domains and form an area-number histogram by counting the number of domains falling within each of series of size ranges. The histogram values define a vector. The contiguous domains can be further processed to define feature points and their relationship mapped to a vector in a manner similar to optical character recognition techniques.

b) Thresholded image may be calibrated to provide high sensitivity to smoke or the range of radiative temperatures associated with a thermal plume characteristic of the cooking appliance. The image processing may be tuned to recognize and distinguish shapes characteristic of thermal plumes for the cooking processes being monitored. The output vector in this case would be a characterization of the particular plume state.

c) Camera may simply band-pass a color, luminosity, or radiative temperature range and cumulate the total of the image corresponding to that passed signal. This would be scalar. This could be done for a quad tree where the total band-passed image area for each quadrant of the image is passed as a component vector, and this could be done down to multiple levels of a quad tree.

d) Spot temperatures of food and empty areas on a grill or other appliance may be used to predict the load. These may be derived from a single IR image and processed to report the total area, average temperature, or other lump parameters predictive of the load.

2. Opacity Sensor a) Opacity may be monitored between two points to detect when a plume is swelling. For example, an opacity sensor may be positioned near the inside of the edge 988 of the canopy 972 and the opacity at that point indicated.

b) The opacity near multiple points may be monitored and provided as a single vector from which it is possible to deduce the scale of turbulence induced by the thermal plume. (The opacity would be expected to vary over time at different locations along the edge in response to three-dimensional turbulent gusts giving rise to temporal and spatial variability in opacity that can be resolved using multiple opacity signals spaced apart and monitored synchronously.)

3. Audio a) A simple frequency profile may be resolved into a histogram whose values correspond to the sound power in each of a series of ranges of audio frequency. The ranges need not be adjacent; they can amount to discrete band pass filters. Depending on the particular cooking process, the sound of frying, grilling meat, operator activity, etc. can make characteristic profiles.

b) A sound-signature classifier may be employed to add the temporal component to the sound classification. Depending on the type of load being monitored, certain audio signatures may be present and recognized using technology as employed in voice recognition. For example, the sound of a switch being turned on, the sounds of a spatula being used on a grill, etc. are discrete audio events that have temporal signatures that are characteristic to them.

4. Temperature a) Sensors placed at various locations may each provide components of a vector.

b) Sensors may be arrayed to provide a signal indicative of a spatial temperature profile which can be characterized by a more compact set of numbers than simply the whole series of temperatures. For example, the sharpest increases of temperature along respective dimensions may be reported to indicate the location of respective boundaries of the thermal plume 1002.

5. Proximity a) The presence of food or other workpieces whose presence is predictive of load, may be sensed. The proximity sensor may be provided as a single signal or multiple signals may be provided from multiple sensors. Alternatively, the distance of the object may be sensed using a proximity sensor. For example, something that grows while it is heated could indicate a stage of a varying load.

b) The presence of an operator and the duration of the operator's presence may be used to signal the load.

6. Motion a) The movement of a worker, tools, and/or workpieces may be predictive of the load.

Figure 46:
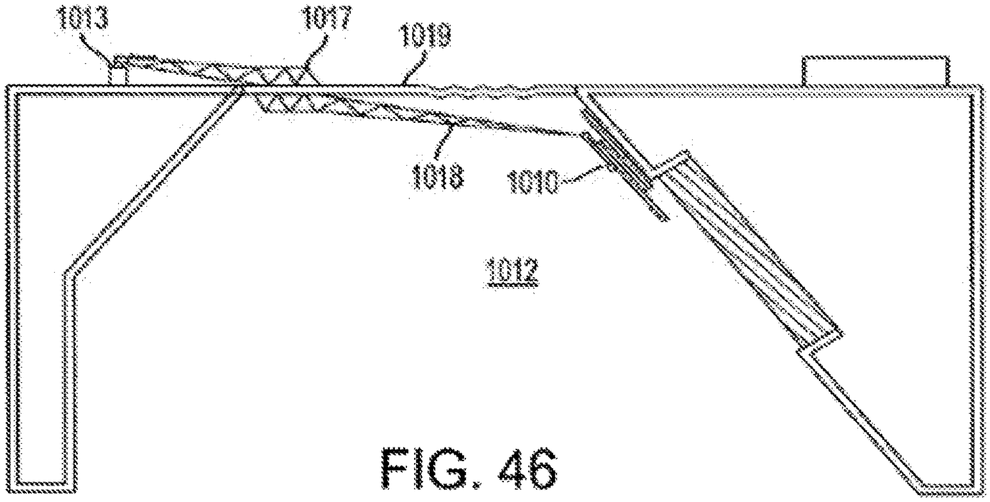
FIG. 46 is a sectional view of a canopy hood with a shutter and an actuator mechanism according to an embodiment of the invention.
Figure 47:
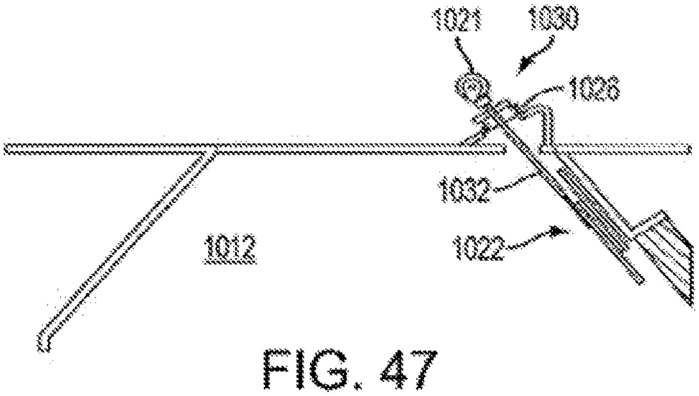
FIG. 47 is a sectional view of a canopy hood with a shutter and an actuator mechanism according to another embodiment of the invention.

Referring now to FIGS. 46 and 47, a great variety of different kinds of actuators may be employed to operate the various flow control devices described above. Preferably, such designs are tolerant of grease deposition from the effluent. A couple of embodiments are shown to illustrate the range of possibilities, but by no means are these intended to represent an exhaustive range. The prior art relating to hermetic seals, motor and actuator seals, high temperature, high corrosion environments, etc. are rich with candidate devices that may be employed. In FIG. 46 a lever formed by a first arm 1017 and a second arm 1018 connected through a top wall 1019 of a canopy. The top wall is corrugated to allow it to flex so that when an actuator 1013 pushes the first arm 1017 upwardly, the second arm 1018 moves downwardly actuating a blind mechanism 1010. The embodiment of FIG. 46 thereby provides a hermetic seal between the linear actuator 1013 and the blind mechanism 1010, which provides flow control. In FIG. 47, another actuator embodiment has a motor and cam 1021 that are mounted externally from the canopy recess 1012 which moves a blind mechanism 1022 through a seal 1030 with a bellows 1026 and pushrod 1032. Again the sensitive mechanisms are isolated outside the canopy recess 1012. Many such mechanisms may be employed and a comprehensive discussion of them is not necessary since many suitable mechanisms are described in the machine mechanism prior art.

Figure 48A:
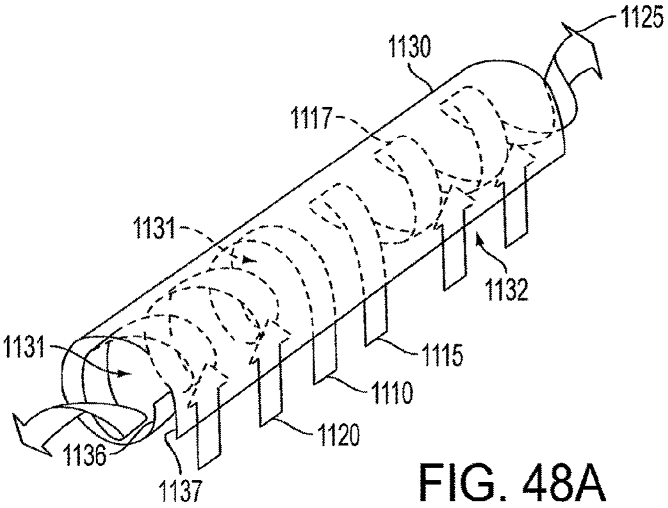
FIG. 48A is a perspective view of an expandable scroll module which functions as a filter/flow throttling mechanism according to an embodiment of the invention.

Referring now to FIG. 48A, a scroll shaped module 1130 has an inlet 1132 through which air is admitted as indicated by arrows 1120, 1110 and 1115. The admitted air swirls as indicated by helical arrow 1117 and exits as indicated by arrow 1125. The helical motion is caused by the fact that the inlet 1132 is at a tangent to the cylindrical space 1131 defined by the scroll shaped module 1130. The inlet 1132 is a gap between an inside distal edge 1136 and an outside distal edge 1137 defined by the scroll shape of the scroll shaped module 1130 and can be increased or reduced in width by flexing the scroll shaped module 1130.

Figure 48B:
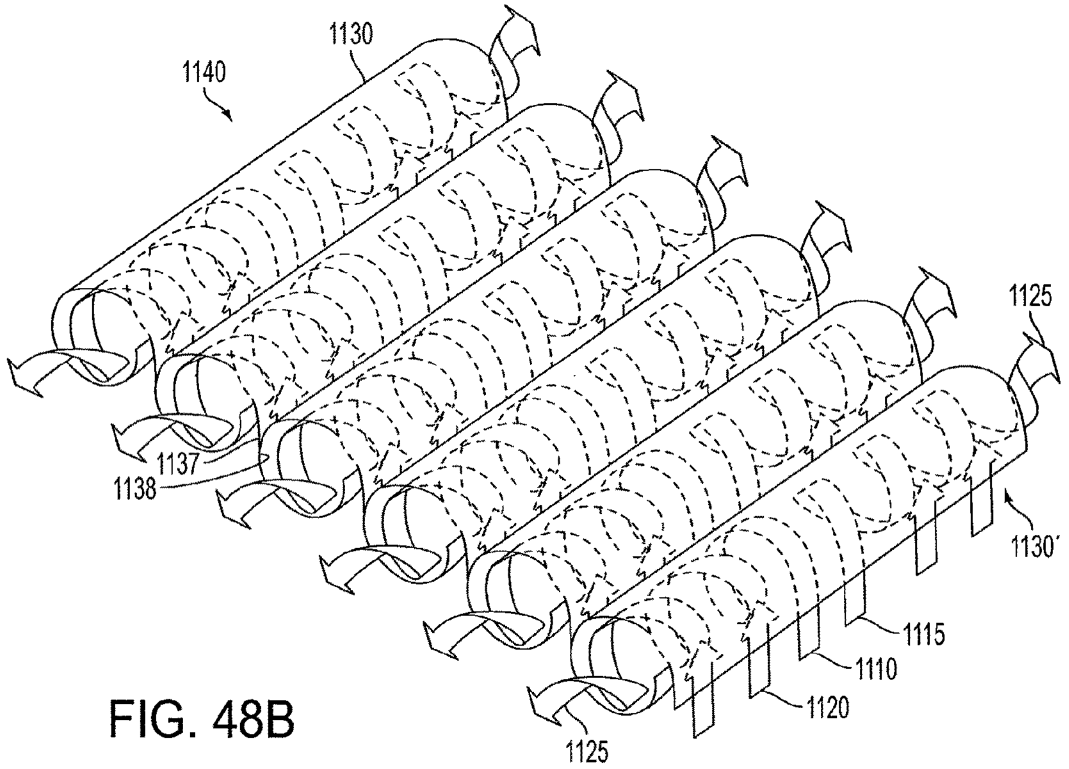
FIG. 48B is a perspective view of a set of the expandable scroll modules of FIG. 48A attached to each other such that they can expand and contract as a unit.
Figure 49:
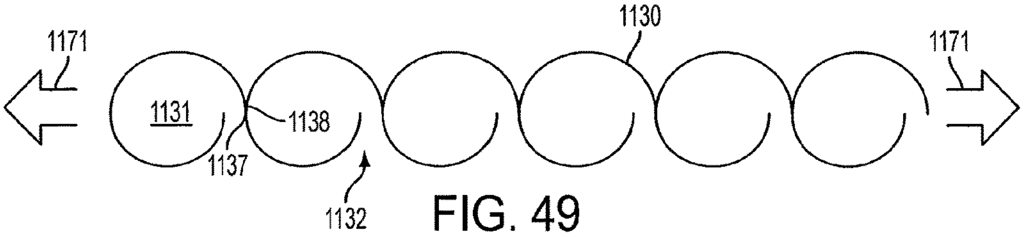
FIG. 49 is a sectional view of the embodiment of FIG. 48 in a throttle-up position.
Figure 50:
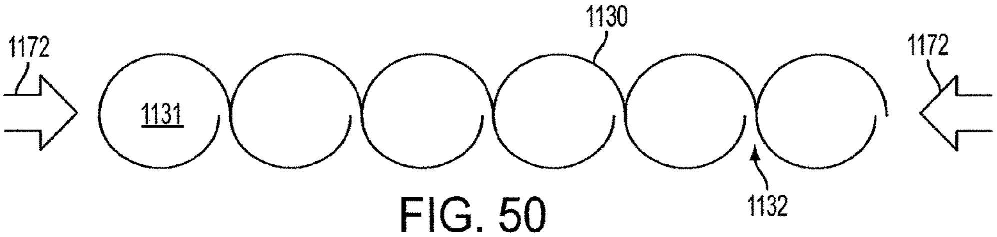
FIG. 50 is a sectional view of the embodiment of FIGS. 48 and 49 in a throttle-down position.

Referring to FIG. 48B, a plurality of scroll shaped modules 1130 are connected to each other to form a filter cartridge 1140. The outside distal edge 1137 of each module 1130 is connected to a middle portion 1138 of an adjacent module 1130 (except for a last module 1130'). The modules 1130 may be supported in any of a number of ways so that when they are drawn apart (as indicated by arrows 1171) as illustrated in FIG. 49, the inlet 1132 expands and the resistance to the inflow of air is reduced. When the modules 1130 are squeezed together, as illustrated in FIG. 50 (the force being as indicated by arrows 1172), the inlet 1132 contracts and resistance to the inflow of air increases. As a result, the bank of cartridges forms a combination filter and flow throttling device.

Figure 51:
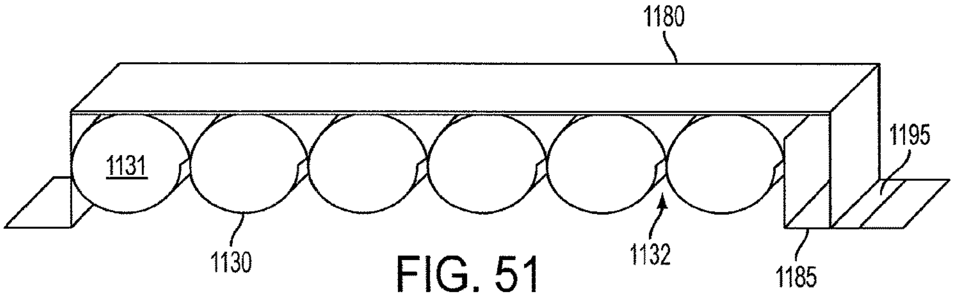
FIG. 51 is a perspective view of the embodiment of FIG. 48B showing a supporting framework and actuator mechanism.
Figure 52:
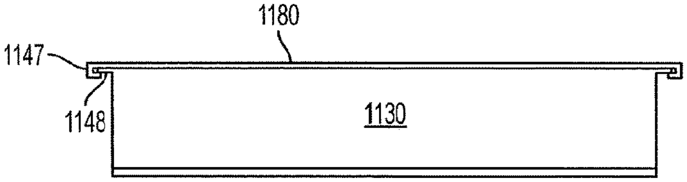
FIG. 52 is a section view of the embodiment of FIG. 51 showing a support feature of that embodiment.

Referring to FIGS. 51 and 52, a support mechanism, which has a back plate 1180 and L-shaped lower braces 1195, supports scroll-shaped modules 1130 through tongues 1148 on each module. The tongues 1148 fit into channels 1147 formed in the edges of back plate 1180. A sliding L-shaped seal member 1185 is slidably attached to one of the L-shaped lower braces 1195 and is moved relative to the back plate 1180 and lower braces 1195 to squeeze and expand the scroll-shaped modules 1130. A tongue of one of the L-shaped lower braces 1195 is elongated to serve as a seal when the entire device is placed in an exhaust vent.

Figure 53:
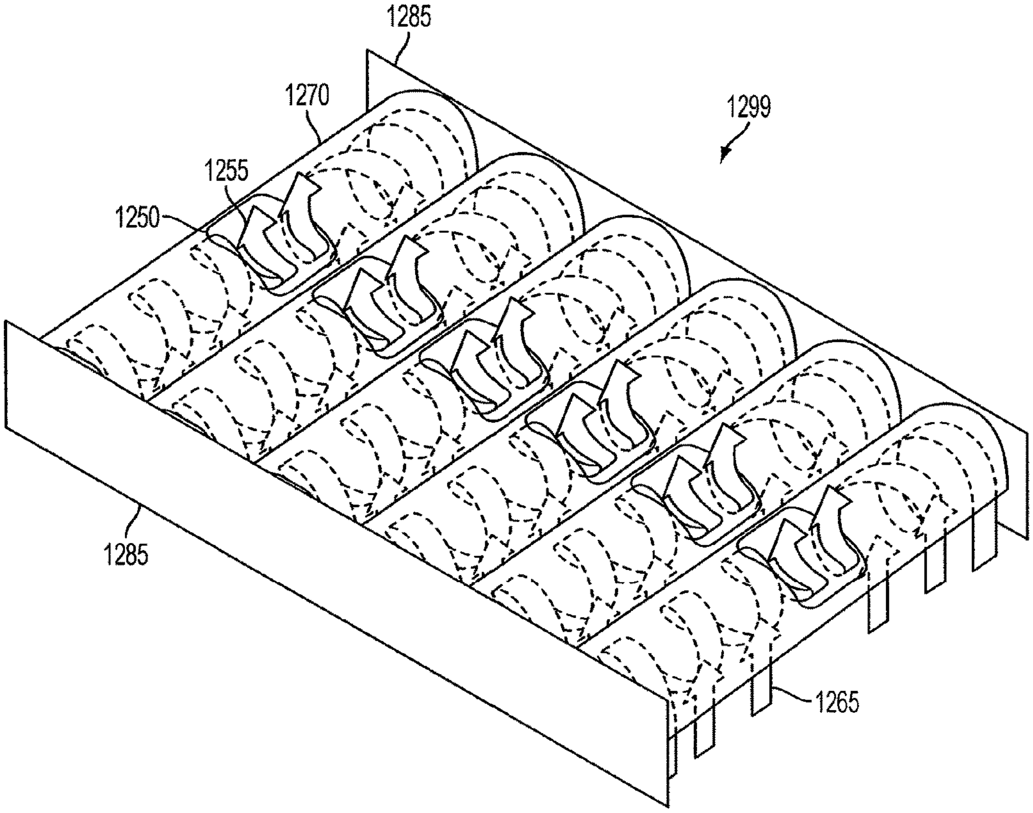
FIG. 53 is a perspective view of an embodiment similar to the embodiment of FIGS. 48A and 48B in which flow exits from a central position between divided sets of scroll modules.
Figure 54:
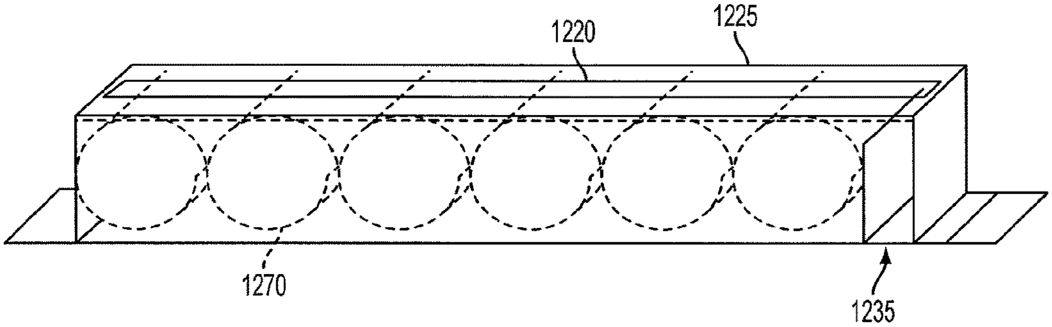
FIG. 54 shows a support structure for the embodiment of FIG. 53.

Referring to FIGS. 53 and 54, a set of scroll shaped modules 1270 have exits 1250 in the center thereof. Thus, functionally, modules 1270 are like the modules 1130 of the previous embodiments except that their outlets are toward the middle of the filter device 1299 rather than along the edges thereof. As in the previous embodiment, the air enters tangentially as indicated by arrows 1265 and swirls in a helical motion until it exits as indicated by arrows 1255. Because the air does not need to exit at the sides, side panels 1285 may be incorporated in a support structure 1225. A single opening 1220 may be formed in the back (downstream face) of the support structure for air to exit. A similar configuration 1235 to that described in connection with the embodiment of FIG. 51 may be used to compress and expand the modules 1270.

Figure 55:
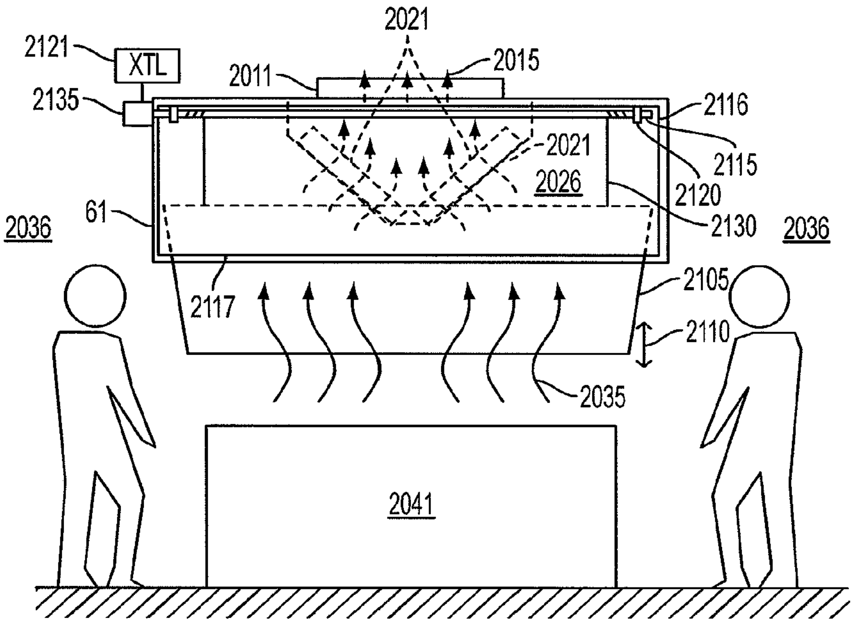
FIG. 55 is a side view illustration of a canopy style hood with adjustable side skirts according to an inventive embodiment.

FIG. 55 is a side view illustration of a canopy style hood 61 with adjustable side skirts 2105 according to an inventive embodiment. Fumes 2035 rise from a cooking appliance 2041 into a suction zone of the hood 2026. The fumes are drawn, along with air from the surrounding conditioned space 2036 the hood 61 occupies, through exhaust vents and grease filters connected to a plenum, the combination indicated at 2021. Suction is provided by an exhaust fan (not shown in the present drawing) connected to draw through an exhaust duct collar 2011. An exhaust stream 2015 is then forced away from the occupied space.

At one or more sides of the exhaust hood 61 are movable side skirts 2105 which may be raised or lowered in a direction 2110 by means of a manual or motor drive 2135. The manual or motor drive 2135 rotates a shaft 2115 which spools or unspools a pair of support lines or straps 2130 to raise or lower the side skirts 2105. The side skirts 2105 and shaft 2115, as well as bearings 2120 and the straps 2130, may be hidden inside a housing 2116 with an open bottom 2117. In a preferred embodiment, the manual or motor drive 2135 is a motor drive controlled by a controller 2121 which controls the position of the side skirts 2105.

Although the above and other embodiments of the invention described below are discussed in terms of a kitchen application, it will be readily apparent to those of skill in the art that the same devices and features may be applied in other contexts. For example, industrial buildings such as factories frequently contain large numbers of exhaust hoods which exhaust fumes in a manner similar to what is obtained in a commercial kitchen environment. It should be apparent from the present specification how minor adjustments, such as raising or lowering the hood, adjusting proportions using conventional design criteria, and other such changes can be used to adapt the invention to other applications. The inventor(s) of the instant patent application consider these to be well within the scope of the claims below unless explicitly excluded.

Figure 56:
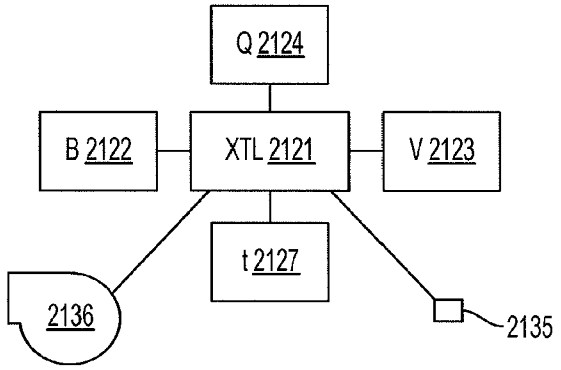
FIG. 56 is a schematic illustration of a control system for the embodiment of FIG. 55 as well as other embodiments.

FIG. 56 is a schematic illustration of a control system for the embodiment of FIG. 55 as well as other embodiments. The controller 2121 may control the side skirts automatically in response to incipient breach, for example, as described in the U.S. Patent Application entitled "Device and Method for Controlling/Balancing Fluid Flow-Volume Rate in Flow Channels," incorporated by reference above. To that end, an incipient breach sensor 2122 may be mounted near a point where fumes may escape due to a failure of capture and containment. Examples of sensors that may be employed in that capacity are discussed below and include humidity, temperature, chemical, flow, and opacity sensors.

Another sensor input that may be used to control the position of the side skirts 2105 is one that indicates a current load 2124. For example, a temperature sensor within the hood 61, a fuel flow indicator, or CO or $CO_2$ monitor within the hood may indicate the load. When either of incipient breach or current load indicates a failure or threat to full capture and containment, the side skirts 2105 may be lowered. This may be done in a progressive manner in proportion to the load. In the case of incipient breach, it may be done by means of an integral of the direct signal from the incipient breach sensor 2122. Of course, any of the above sensors (or others discussed below) may be used in combination to provide greater control, as well as individually.

A draft sensor 2123 such as a velocimeter or low level pressure sensor or other changes that may indicate cross currents that can disrupt the flow of fumes into the hood. These are precisely the conditions that side skirts 2105 are particularly adapted to control. Suitable transducers are known such as those used for making low level velocities and pressures. These may be located near the hood 61 to give a general indication of cross-currents. When cross-currents appear, the side skirts 2105 may be lowered. Preferably the signals or the controller 2121 is operative to provide a stable output control signal as by integrating the input signal or by other means for preventing rapid cycling, which would be unsuitable for the raising and lowering of the side skirts 2105.

The controller 2121 may also control the side skirts 2105 by time of day. For example, the skirts 2105 may be lowered during warm-up periods when a grill is being heated up in preparation for an expected lunchtime peak load. The controller 2121 may also control an exhaust fan 2136 to control an exhaust flow rate in addition to controlling the side skirts 2105 so that during periods when unhindered access to a fume source, such as a grill, is required, the side skirts 2105 may be raised and the exhaust flow may be increased to compensate for the loss of protection otherwise offered by the side skirts 2105. The controller may be configured to execute an empirical algorithm that trades off the side skirt 2105 elevation against exhaust flow rate. Alternatively, side skirt 2105 elevation and exhaust rate may be controlled in a master-slave manner where one variable is established, such as the side skirt 2105 elevation in response to time of day, and exhaust rate is controlled in response to one or a mix of the other sensors 2124, 2123, 2127, and/or 2122.

Figure 57:
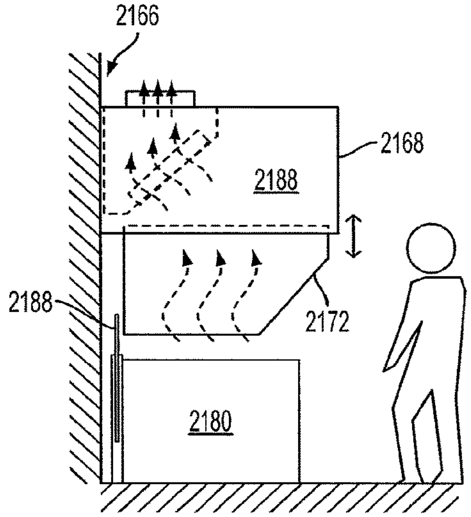
FIG. 57 is a side view illustration of a backshelf hood with a fire gap and movable side skirts and a movable back skirt.

FIG. 57 is a side view illustration of a backshelf hood 2168 with a fire safety gap 2166 and movable side skirts 2172 and a movable back skirt 2188. The side skirts 2172 may be one or both sides and may be manually moved or automatically driven as discussed above with reference to FIGS. 55 and 56. The movable back skirt 2188 is located behind the appliance 2180 and is raised to block the movement of fumes due to cross drafts. Alternatively, the back skirt may be attached to the hood 2168 and lowered into position. Note that the back skirt 2188 is shown in a partly extended position and may be extended variable amounts depending on the degree of shielding required.

Note that any of the skirts discussed above and below may be configured based on a variety of known mechanical devices. For example, a skirt may be hinged and pivoted into position. It may have multiple segments such that it unfolds or unrolls, for example, as does a metal rolling garage door.

Figure 58:
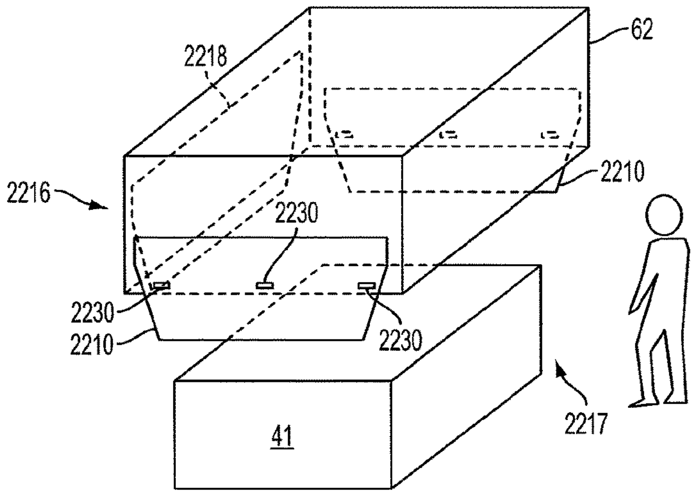
FIG. 58 is a side view illustration of a canopy style hood with adjustable side skirts according to another inventive embodiment.

FIG. 58 is a side view illustration of a canopy style hood 62 with adjustable side skirts 2210 according to another inventive embodiment. The side skirts 2210 may be manually or automatically movable. There may be two skirts or one skirt at either of two ends of the hood 62. There may be more or less skirts on adjacent sides of the hood 62, such as a back side 2216. In some situations, where most of the access required to the appliances can be accommodated on a front side 2217 of the hood 62, it may be feasible to lower a rear skirt 2218.

Note that it is unnecessary to discuss the location and type of drives to be used and the precise details of manual and automatic skirts because they are well within the ken of machine design. For the same reason, as here, examples of suitable drive mechanisms are not repeated in the drawings.

Also shown in FIG. 58 is a suitable location for one or more proximity control sensors 2230 that be used in the present or other embodiments. Proximity sensors may be used to give an indication of whether access to a corresponding side of the appliance 41 is required, in a manner similar to that of an automatic door of a public building. One or more proximity sensors 2230 may be used to trigger the raising or lowering of the side skirts.

Figure 59:
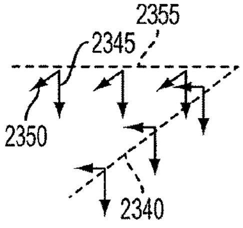
FIG. 59 is a figurative representation of a combination of horizontal and vertical jets to be generated at the edge of a hood according to an inventive embodiment.

As taught in U.S. Pat. No. 6,851,421 for "Exhaust Hood with Air Curtain," incorporated by reference above, a virtual barrier may be generated to help block cross-drafts by means of a curtain jet located at an edge of the hood. FIG. 59 is a figurative representation of a combination of horizontal 2350 and vertical 2345 jets to be generated at the edge 2340 and 2355 of a hood according to an inventive embodiment, which has been shown by experiment to be advantageous in terms of minimizing the exhaust flow required to obtain full capture and containment. In a preferred configuration, the horizontal and vertical jets are made by forming holes in a plenum, for example holes of about 3-6 mm in diameter, with a regular spacing so that the individual jets coalesce some distance away from the openings to form a single planar jet. The initial velocities of the horizontal jets are preferably between 2 and 3.5 times the initial velocities of the vertical jets. The initial velocity in this case is the point at which individual jets coalesce into a single planar jet.

Figure 61:
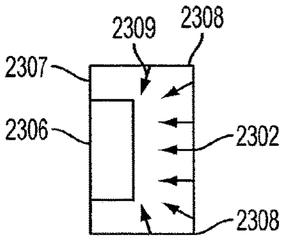
FIG. 61 is an illustration of a plan view of a hood showing a central location of the exhaust vent.
Figure 60:
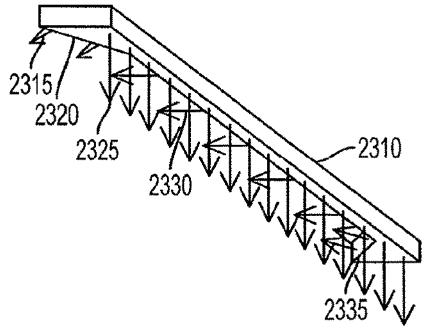
FIG. 60 is a figurative illustration of a plenum configured to generate vertical and horizontal jets with diagonal horizontal jets at ends of the plenum according to an inventive embodiment.

FIG. 60 is a figurative illustration of a plenum 2310 configured to generate the vertical 2325 and horizontal 2330 jets with diagonal horizontal jets 2315 at ends of the plenum 2310 according to an inventive embodiment. Referring momentarily to FIG. 61, most hoods 2307 have an exhaust vent portion 2306 (such as the plenum, filter, vent combination indicated at 2021 in FIG. 55) within the hood recess that is centrally located. Even if the hood 2307 has a large aspect ratio, horizontal jets 2309 (2330 in FIG. 60) are more effective at capturing exhaust if they are directed toward the center of the hood near the ends 2308 of the long sides 2302. Thus, in a preferred configuration of the plenum 2310, the ends 2335 of the plenum have an angled structure 2320 to project the horizontal jets diagonally inward as indicated at 2315.

Figure 62A:
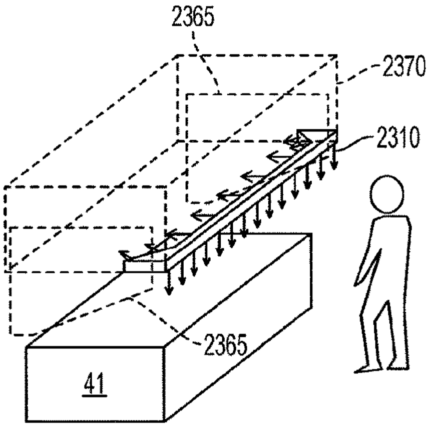
FIGS. 62A and 62B illustrate the position of the plenum of FIG. 60 as would be installed in a wall-type (backshelf) hood as well as a combination of the horizontal and vertical jets with side skirts according to at least one inventive embodiment.
Figure 62B:
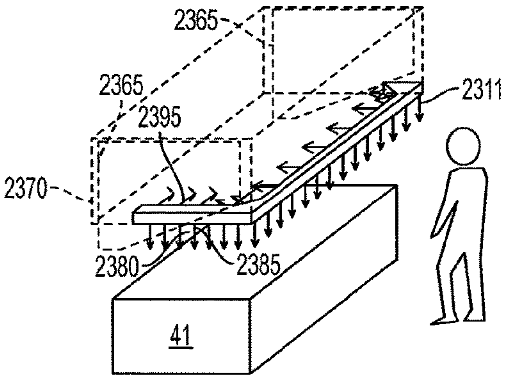

FIGS. 62A and 62B illustrate the position of the plenum 2310 of FIG. 60 as would be installed in a wall-type (backshelf) hood 2370 as well as a combination of the horizontal and vertical jets with side skirts 2365 according to another inventive embodiment. This illustration shows how the plenum 2310 of FIG. 60 may be mounted in a backshelf hood 2370. In addition, the figure shows the combination of the vertical and horizontal jets and the side skirts 2365. In such a combination, the velocity of the vertical and horizontal jets may be reduced when the side skirts 2365 are lowered and increased when the side skirts are raised. Note that although not shown in an individual drawing, the same control feature may be applied to horizontal-only jets and vertical-only jets which are discussed in "Exhaust Hood with Air Curtain," incorporated by reference above. FIG. 62A shows the side skirts 2365 in a lowered position and FIG. 62B shows the side skirts 2365 in a raised position. Note that the plenum 2310 may be made integral to the hood and also that a similar mounting may be provided for canopy style hoods. FIG. 62B also shows an alternative plenum configuration 2311 with a straight return 2385 on one side which generates vertical 2380 and horizontal 2395 jets along a side of the hood 2370. Although shown on one end only, the return leg 2385 may be used on both ends and is also applicable to canopy style hoods with a mirror-symmetrical arrangement around the wall (not shown).

Figure 63A:
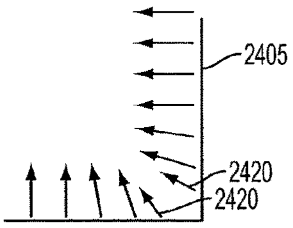
FIGS. 63A-63C illustrate various ways of wrapping a series of horizontal jets around a corner to avoid end effects according to inventive embodiment(s).
Figure 63B:
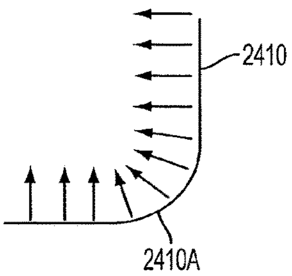
Figure 63C:
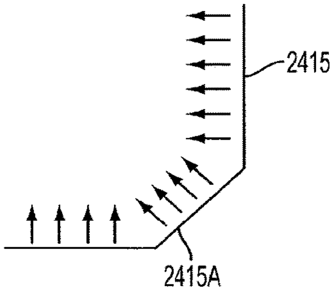
Figure 63D:
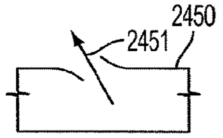
FIG. 63D illustrates a way of creating a hole in a plenum that redirects a small jet without a separate fixture by warping the wall of the plenum.

FIGS. 63A-63C illustrate various ways of wrapping a series of horizontal jets around a corner to avoid end effects according to inventive embodiment(s). These alternative arrangements may be provided by shaping a suitable plenum as indicated by the respective profiles 2405, 2410, and 2415. Directional orifices may be created to direct flow inwardly at a corner without introducing a beveled portion 2415A or curved portion 2410A as indicated by arrows 2420 in FIG. 63A. FIG. 63D illustrates a configuration for creating a directional orifice in a plenum 2450 to direct a small jet 2451 at an angle with respect to the wall of the plenum 2450. This may done by warping the wall of the plenum 2450 as indicated or by other means as disclosed in the references incorporated herein.

Figure 64A:
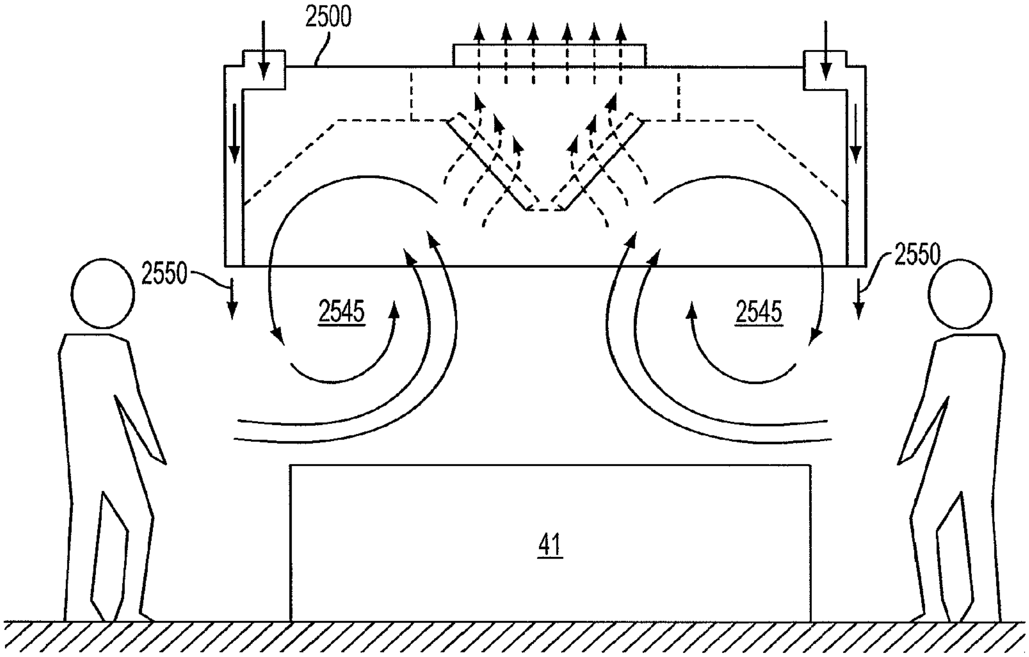
FIG. 64A illustrates a canopy-style hood with vertical jets and a configuration that provides a vertical flow pattern that is subject to an end effects problem.

FIG. 64A illustrates a canopy-style hood 2500 with vertical jets 2550 and a configuration that provides a vortical flow pattern 2545 that is subject to an end effects problem. The end effects problem is that where the vortices meet in corners, the flow vertical flow pattern is disrupted. As discussed in "Exhaust Hood with Air Curtain," incorporated by reference above, the vortical flow pattern 2545 works with the vertical jets 2550 to help ensure that fluctuating fume loads can be contained by a low average exhaust rate. But the vortex cannot make sharp right-angle bends so the quasi-stable flow is disrupted at the corners of the hood.

Figure 64B:
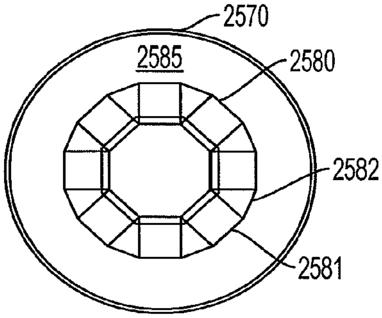
FIGS. 64B and 64C illustrate configurations of a canopy hood that reduce or eliminate the end effect problem of the configuration of FIG. 64A.
Figure 64C:
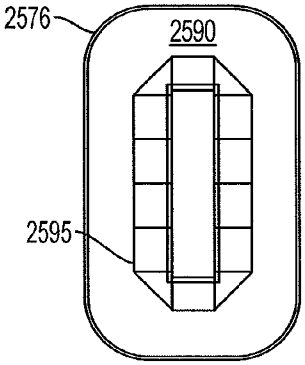

FIGS. 64B and 64C illustrate configurations of a canopy hood that reduce or eliminate the end effect problem of the configuration of FIG. 64A. Referring to FIGS. 64B and 64C, a round hood 2570 or one with rounded corners 2576 reduces the three-dimensional effects that can break down the stable vortex flow 2545. In either shape, a toroidal vortex may be established in a curved recess 2585 or 2590 with the vertical jets following the rounded edge of the hood. Thus, the sectional view of FIG. 64A would roughly be representative of any arbitrary slice through the hoods 2576, 2570 shown in plan view in FIGS. 64B and 64C.

The figures also illustrate filter banks 2580 and 2595. It may be impractical to make the filter banks 2580 and 2595 rounded, but they may be piecewise rounded as shown. Thus filter-holding plenum portions 2581 may be rectangular and joined by angled plenum portions 2582.

Figure 64D:
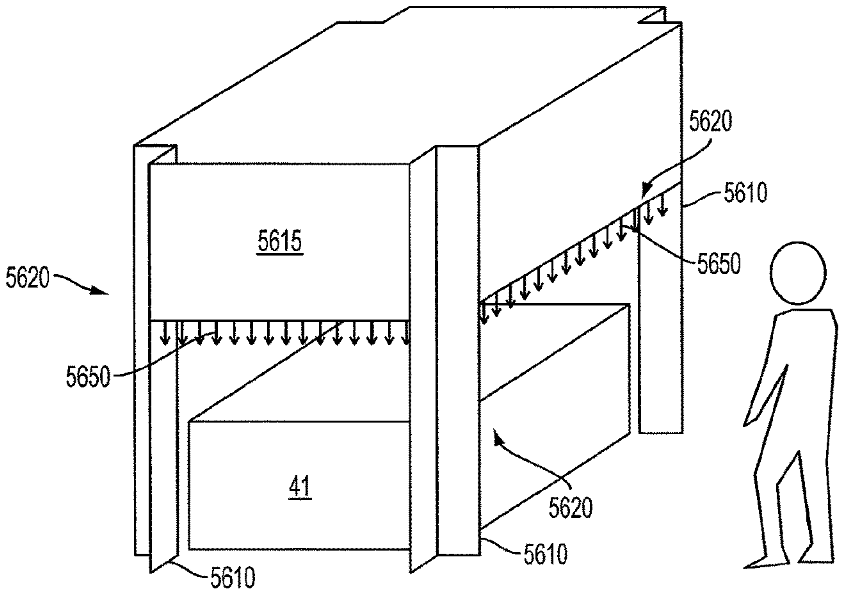
FIG. 64D illustrates a corner shield configuration for a hood with curtain jets.

FIG. 64D illustrates a configuration of a canopy hood 5615 that reduces the end effect problem of the configuration of FIG. 64A by supporting the canopy using columns 5610 at the corners. The columns 5610 are shaped so as to eliminate interactions at the ends of the straight portions 5620 of the hood 5615. Vertical jets 5650 do not wrap around the hood 5615 and neither does the internal vortex (not illustrated) since there are separate vortices along each edge bounded by the columns 5610.

Figure 65A:
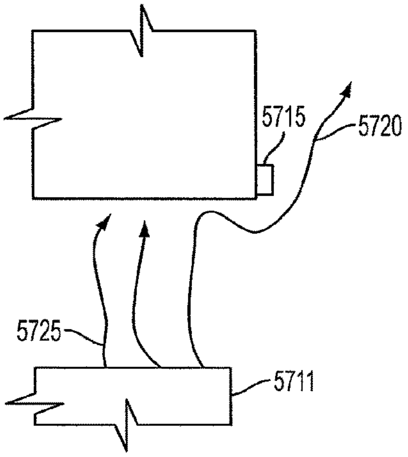
FIG. 65A illustrates an application for a breach detector for a hood control system.

FIG. 65A illustrates a hood configuration with a sensor that uses incipient breach control to minimize flow volume while providing capture and containment. Incipient breach control is discussed in "Device and Method for Controlling/Balancing Fluid Flow-Volume Rate in Flow Channels," incorporated by reference above. Briefly, when fumes 5725 rise from a source appliance 5711, and there is a lack of sufficient exhaust flow or there is a cross-draft, part of the fumes may escape as indicated by arrow 5720. A sensor located at 5715 or nearby position may detect the temperature, density, or other detectable feature of the fumes to indicate the breach. The indication may be used by a controller to control exhaust flow as discussed in the above patent or others such as U.S. Pat. No. 6,170,480 entitled "Commercial Kitchen Exhaust System," which is hereby incorporated by reference as if fully set forth herein in its entirety.

Various sensors may be used including optical, temperature, opacity, audio, and flow rate sensor in the present context. It is also proposed that chemical sensors such as carbon monoxide, carbon dioxide, and humidity may be used for breach detection. In addition, as shown in FIG. 65B, an interferometric sensor may also be employed to detect an associated change, or fluctuation, in index of refraction due to escape of fumes.

Figure 65B:
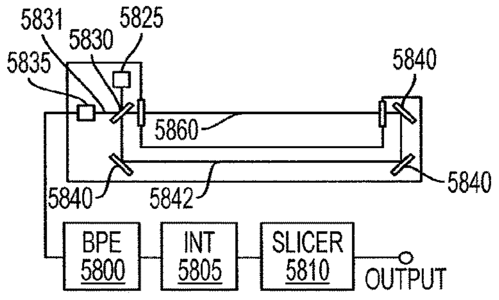
FIG. 65B illustrates an interferometer sensor and a detector conditioning circuit for various embodiments of interferometer-based sensing of fume breach.

Referring to FIG. 65B, a coherent light source 5825, such as a laser diode, emits a beam that is split by a beam splitter 5830 to form two beams that are incident on a photo-detector 5835. A reference beam 5831 travels directly to the detector 5835. A sample beam 5842 is guided by mirrors 5840 to a sample path 5860 that is open to the flow of ambient air or fumes. The reference beam 5831 and the sample beam 5842 interfere in the beam splitter, affecting the intensity of the light falling on the detector 5835. The composition and temperature of the fumes creates fluctuations in the effective path length of the sample path 5860 due to a fluctuating field of varying index of refraction. This in turn causes the phase difference between the reference 5831 and sample 5842 beams to vary causing a variation in intensity at the detector 5835.

The direct output of the detector 5835 may be passed through a bandpass filter 5800, an integrator 5805, and a slicer (threshold detector) 5810 to provide a suitable output signal. A bandpass filter may be useful to eliminate slowly varying components that could not be a result of fumes, such as when a person leans against the detector, as well as changes that are too rapid to be characteristic of the turbulent flow field associated with a thermal plume or draft, such as motor vibrations. An integrator ensures that the momentary transients do not create false signals, and the slicer provides a threshold level.

Figure 65C:
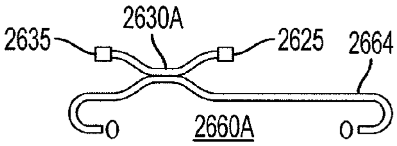
FIG. 65C illustrates an interferometer using a directional coupler and optical waveguides instead of beam splitter and mirrors.

Referring to FIG. 65C, an alternative embodiment of a detector uses a directional coupler 2630A instead of a beam splitter as in the previous embodiment. Instead of mirrors, a waveguide 2664 is used to form a sample path 2660A. A light source 2625 sends light into the directional coupler 2630A. Light is split by the coupler 2630A with one component going to the detector 2635 and the other passing through the sample path 2660A and back to the directional coupler 2630A. Fluctuations in the phase of the return light from the sample path 2660A cause variations in the intensity incident on the detector 2635 as in the previous embodiment.

Figure 65D:
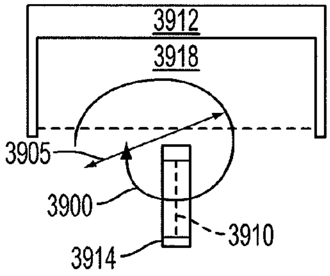
FIG. 65D illustrates some mechanical issues concerning measurements that depend on the structure of turbulence.

Preferably, the interferometric detector should allow gases to pass through the measurement beam without being affected unduly by viscous forces. If the sample path is confined to a narrow channel, viscous forces will dominate and the detector will be slow to respond. Also, from a practical standpoint, filtering of slowly varying electrical signals may be more difficult. If the sample path is too long the signal might be diminished due to an averaging effect. The effect of these considerations varies with the application. It may also be preferable for the gap to be longer than the length scale of the temperature (or species, since the fumes may be mixed with surrounding air) fluctuations so as to provide a distinct signature for the signal if the gap would substantially impede the flow. Otherwise, the transport of temperature and species through the sample beam would be governed primarily by molecular diffusion making the variations slow, for example, if the sample beam were only exposed in a narrow opening. However, while this may be desirable in some detector applications, such applications are likely removed from typical commercial kitchen applications. Referring to FIG. 65D, an eddy is figuratively shown at 3900. The structure of the detector 3912 may provide a space 3918 (i.e., a sample gap 3918) that is large relative to the smallest substantial turbulent scale as indicated at 3905. Alternatively, the structure of the detector may be smaller than the smallest turbulent scale, but thin and short as indicated at 3914 in which case viscous forces may not impede greatly the variation of the constituent gases in the sample path 3910 due to turbulent convection. As is known in the art, the speed of flow for forced convection and the temperature differences for natural convection determine how small the smallest turbulent eddies are. High turbulent energy drives the momentum effects toward smaller scales before the turbulent energy is dissipated in viscous friction. Lower turbulent energy will result in larger minimum turbulent scales. Note that an interferometric detector may detect fluctuations even when the sample gap 3918 is smaller than the smallest turbulent eddies, though the effect registered may not be as rapid or the fluctuations as extreme due to the species or temperature diffusion transport required.

Note that another alternative for measuring fluctuations in temperature, species, and or flow is a hot film or hot wire anemometer. Such devices, as is known, can have extremely sensitive response times. As is also known, they respond to thermal diffusivity and heat transfer coefficient, which change with species, as well as temperature and velocity, all of which fluctuate in a fume driven or fume-filled turbulent flow field.

Figure 66:
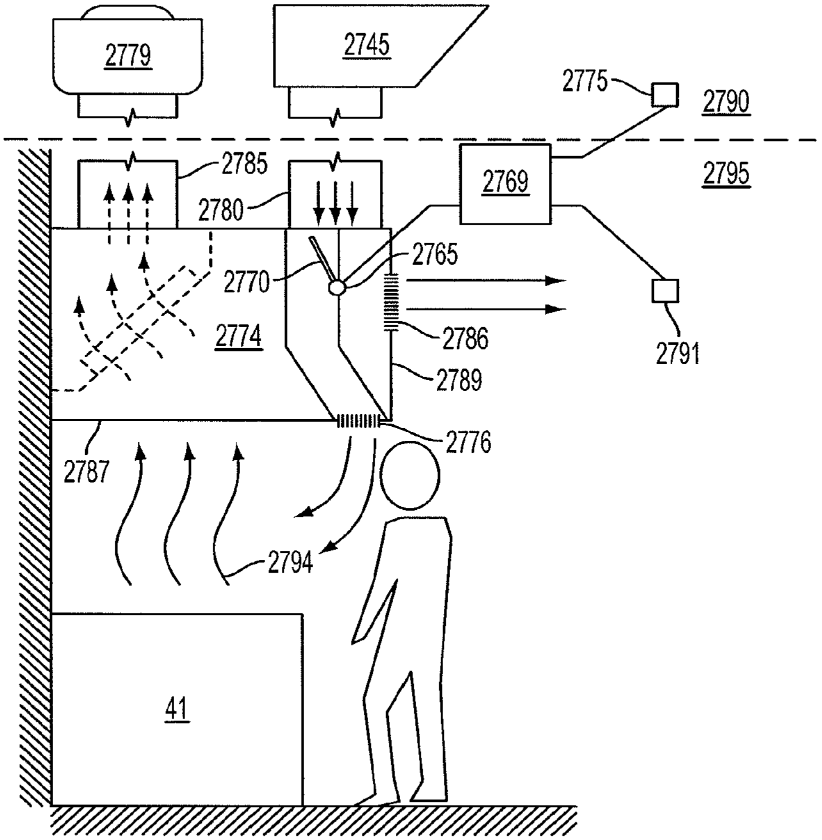
FIG. 66 illustrates a combination make-up air discharge register and hood combination with a control mechanism for apportioning flow between room-mixing discharge and short-circuit discharge flows.

FIG. 66 illustrates a combination make-up air discharge register/hood combination with a control mechanism for apportioning flow between room-mixing discharge and short-circuit discharge flows. A hood 2787 has a recess 2774 through which fumes 2794 flow to plenum 2785, where they are exhausted by an exhaust fan 2779, usually located on the top of a ventilated structure. A make-up air unit 2745 replaces the exhausted air by blowing air into a supply duct 2780 which vents to a combination plenum 2789. Plenum 2789 feeds a mixed air supply register 2786 and a short-circuit supply register 2776. The fresh air supplied by the make-up air unit 2745 is apportioned between the mixed air supply register 2786 and the short-circuit supply register 2776 by a damper 2770 whose position is determined by a motor 2765 controlled by a controller 2769.

When air is principally fed to the short-circuit supply register 2776, it helps to provide most of the air that is drawn into the hood 2787 along with the fumes and exhausted. Short-circuit supply of make-up air is believed by some to offer certain efficiency advantages. When the outside air is at a temperature that is within the comfort zone, or when its enthalpy is lower in the cooling season or higher in the heating season, most of the make-up air should be directed by the controller 2769 into the occupied space through the mixed air supply register 2786. When the outside air does not have an enthalpy that is useful for space-conditioning, the controller 2769 should cause the make-up air to be vented through the short-circuit supply register 2776.

Figure 67:
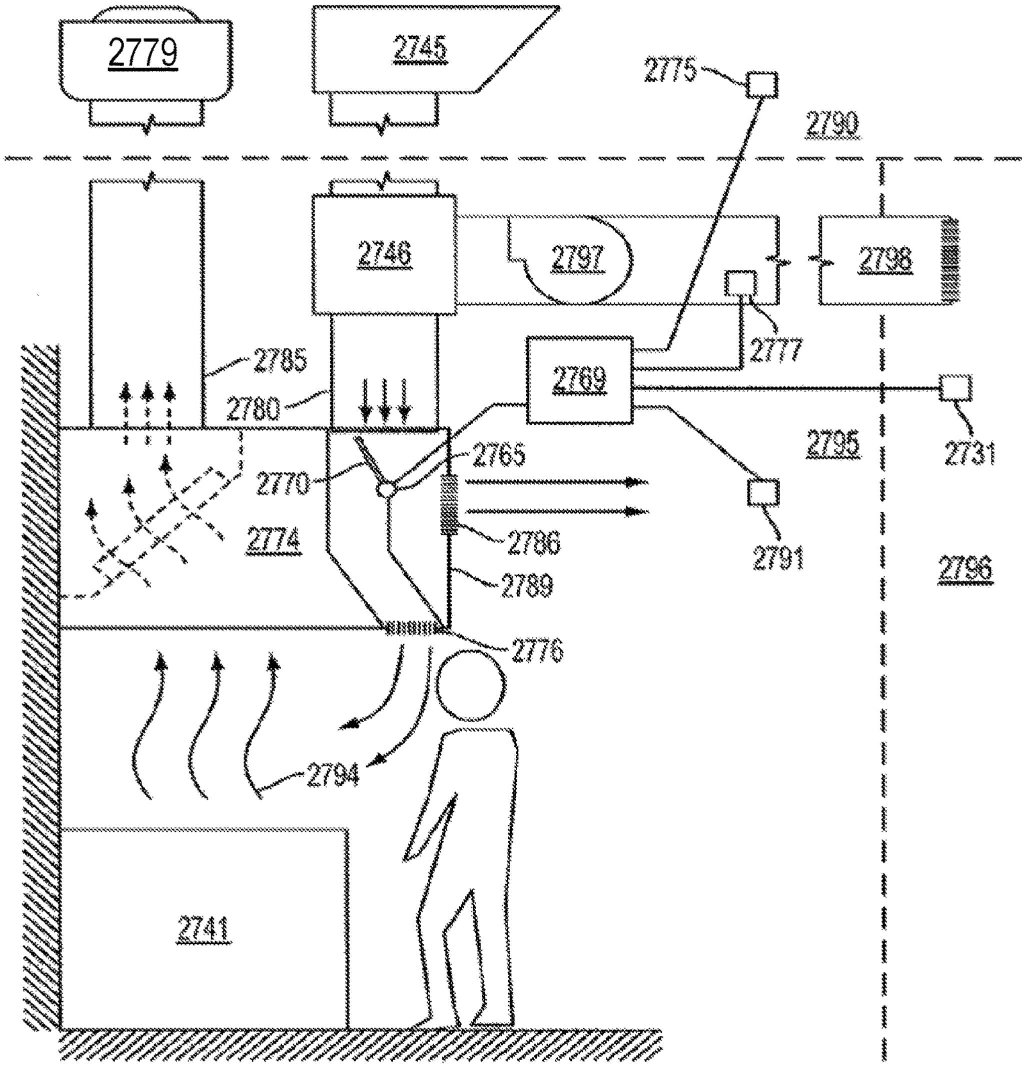
FIG. 67 illustrates a combination make-up air discharge register and hood combination with a control mechanism for apportioning flow between room-mixing discharge and a direct discharge into the exhaust zone of the hood from either outdoor air, transfer air from another conditioned space, or a mixture thereof.

FIG. 67 illustrates a combination make-up air discharge register and hood combination with a control mechanism for apportioning flow between room-mixing discharge and a direct discharge into the exhaust zone of the hood. The make-up air may come from outdoor air, air transferred from another conditioned space, or a mixture thereof. A blower 2797 brings in transfer air, which may be used to supply some of the make-up air requirement and provide a positive enthalpy contribution to the heating or cooling load. The staleness of transfer air brought into the heavily ventilated environment of a kitchen is offset by the total volume of make-up (fresh) air that is required to be delivered. Sensors 2775 on the outside 2790, sensors 2791 in the occupied space 2795, sensors 2777 in the transfer air stream 2798, and/or sensors 2731 in the other conditioned space 2796 may be provided to indicate the conditions of the source air streams. A mixing box 2746 may be used to provide an appropriate ratio of transfer air and fresh air. The ratio will depend on the exhaust requirements of the occupied space 2795. Control of the damper 2770 is as discussed with reference to FIG. 66.

Figure 68A:
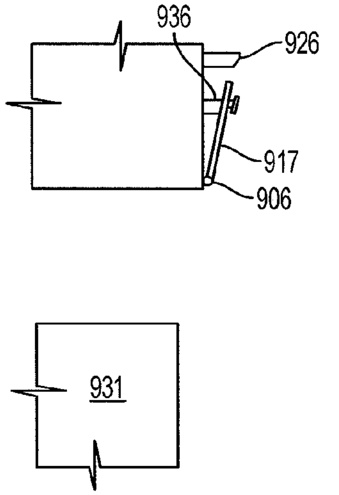
FIGS. 68A and 68B illustrate drop-down skirts that can be manually swung out of the way and permitted to drop into place after a time interval.
Figure 68B:
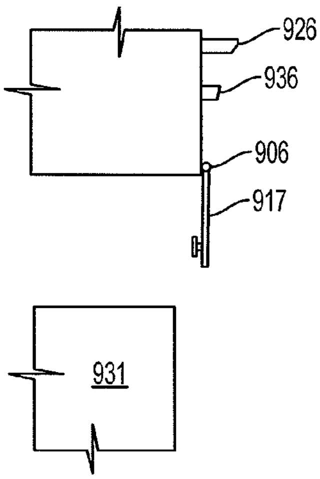
Figure 69:
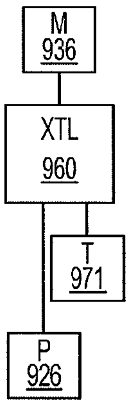
FIG. 69 illustrates a control system for the device of FIGS. 68A and 68B.
Figure 70:
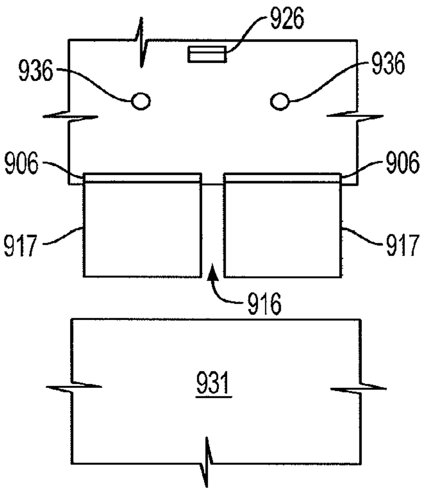
FIG. 70 illustrates an embodiment of a device consistent with the description of FIGS. 68A and 68B.

FIGS. 68A, 68B, and 70 illustrate drop-down skirts that can be manually swung out of the way and permitted to drop into place after a lapse of a watchdog timer under control of a controller shown in FIG. 69. FIGS. 68A and 68B are side views of a drop-down skirt 917 that pivots from a hinge 906 from a magnetically suspended position over a fume source 931, such as a cooking device. The skirt(s) 917 is (are) shown in a raised position in FIG. 68A and in a dropped position in FIG. 68B. A magnetic holder/release mechanism 936, which may include an electromagnet or permanent magnet, holds the skirt panel 917 in position out of the way of an area above a fume source 931. The skirts 917 may be released after being moved up and engaged by the magnetic holder/release mechanism 936. After a period of time monitored by a controller 960, the skirts 917 may be released from the magnetic holder/release mechanism 936. The controller 960 may be connected to a timer 971, a proximity sensor 926, and the magnetic holder/release mechanism 936. The proximity sensor 926 may be one such as used to activate automatic doors. If nothing is within view of the proximity sensor after the lapse of a certain time, the controller may release the skirt 917. When released by the magnetic holder/release mechanism 936, the skirt 917 falls into the position of FIG. 68B to block drafts. Preferably, as shown in the front view of FIG. 70, there are multiple skirts 917 separated by gaps 916. A passing worker may scan the area behind the skirts 917 even though the skirts are down if the worker moves at least partly parallel to the plane of the skirts 917. In an embodiment, the magnetic holder/release mechanism 936 may be combined with the controller 960, the timer 971, and the proximity sensor 926 in a unitary device.

Figure 73:
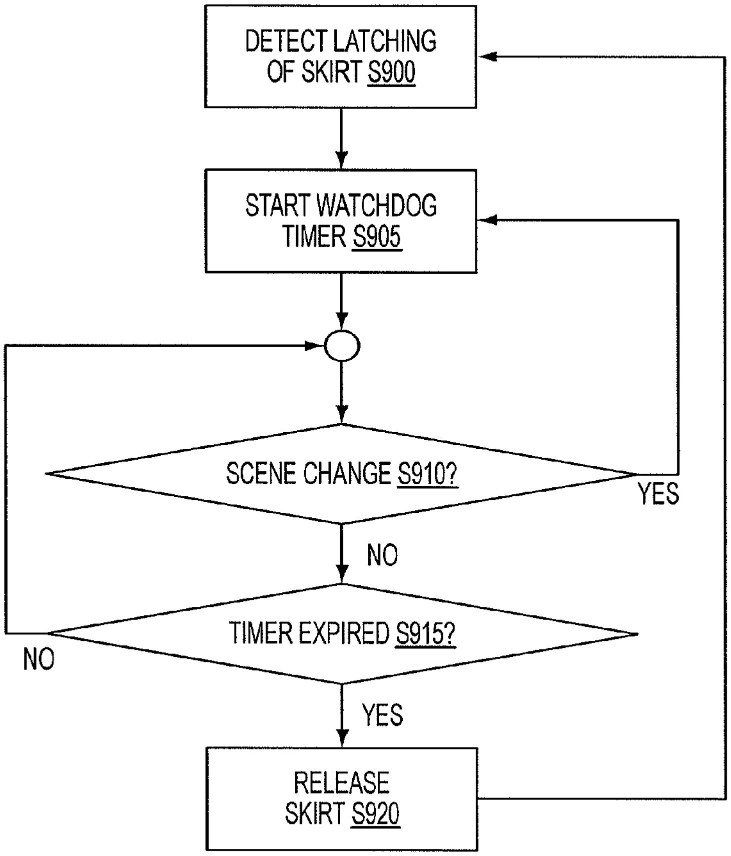
FIG. 73 is a flow diagram of a process for controlling the drop-down skirts of FIGS. 68A, 68B, and/or 70.

Although the discussion with regard to the above embodiments is primarily related to the flow of air, it is clear that principles of the invention are applicable to any fluid. Also note that instead of proximity sensors the skirt release mechanisms described may be actuated by video cameras linked to controllers configured or trained to recognize events or scenes. The very simplest of controller configurations may be provided. For example, the controller may recognize when a blob larger than a particular size appears or disappears within a brief interval in a scene or when a scene remains stationary for a given interval. An example of a control process is illustrated in FIG. 73. A controller detects the latching of the skirt as step S900 and starts a watchdog timer at step S905. Control then loops through S910 and S905 as long as scene changes are detected. Again, simple blob analysis is sufficient to determine changes in a scene. Here we assume the camera is directed to view the scene in front of the hood so that if a worker is present and working, scene changes will continually be detected. If no scene changes are detected until the timer expires (step S915), then the skirt is released at step S920 and control returns to step S900 where the controller waits for the skirt to be latched. A similar control algorithm may be used to control the automatic lowering and raising of skirts in the embodiments of FIGS. 55-58, discussed above. Instead of releasing the skirt, the skirt would be extended into a shielding position and instead of waiting for the skirt to be latched, a scene change would be detected and the skirt automatically retracted.

Figure 71:
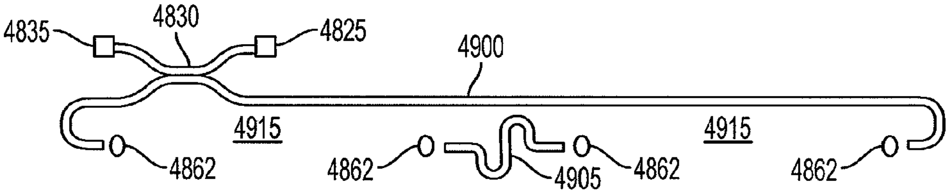
FIG. 71 illustrates a multi-sensor configuration of an interference detector.
Figure 72:
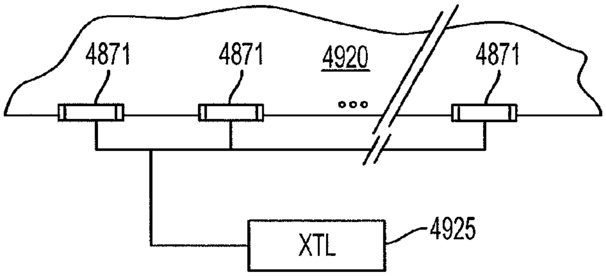
FIG. 72 illustrates another view of the multi-sensor configuration of FIG. 71 showing installation on a hood.

Referring to FIG. 71, multiple sample gaps, such as the two indicated at 4915 may be linked together in a common light path by a light guide 4900 and a single directional coupler 4830 or equivalent device. As in prior embodiments, a light source 4835 and detector 4825 are connected by a directional coupler 4830 with focusing optics 4862 and one or more linking light guides 4905 to provide any number of sample paths. FIG. 72 shows a hood edge 4920 with multiple individual sample devices 4871 which conform to any of the descriptions above linked to a common controller 4925. Although parallel connections are illustrated, serial connections of either fiber or conductor may be provided depending on the configuration.

Although in the embodiments described above and elsewhere in the specification, real-time control is described, it is recognized that some of the benefits of the invention may be achieved without real-time control. For example, the flow control device 120 may be set manually or periodically, but at intervals to provide the local load control without the benefit of real-time automatic control.

Features of the disclosed embodiments may be combined, rearranged, omitted, etc., within the scope of the invention to produce additional embodiments. Furthermore, certain features may sometimes be used to advantage without a corresponding use of other features.

It is, thus, apparent that there is provided, in accordance with the present disclosure, methods, systems, and devices for real-time control of exhaust flow. Many alternatives, modifications, and variations are enabled by the present disclosure. While specific embodiments have been shown and described in detail to illustrate the application of the principles of the invention, it will be understood that the invention may be embodied otherwise without departing from such principles. Accordingly, Applicants intend to embrace all such alternatives, modifications, equivalents, and variations that are within the spirit and scope of the present invention.

The invention claimed is:

1. An exhaust system, comprising:

a programmable controller;

an exhaust hood positioned over a cooking appliance;

a video camera adapted for generating thermal images of a scene captured thereby, the video camera being connected to the controller and positioned and aimed to view the exhaust hood so as to capture images of a vicinity of the exhaust hood such that any escaping thermal plume generated thereby are captured by said video camera;

the controller being programmed to classify images generated by the video camera;

the controller being connect to a fan and adapted to control an exhaust rate responsively to a result of a classification of said thermal images.

2. The system of claim 1, wherein the controller is programmed to raise an exhaust flow rate when said thermal images indicate a breach of containment by said exhaust hood.

3. The system of claim 1, further comprising an additional video camera adapted for generating further thermal images.

4. The system of claim 1, wherein the controller is programmed to ignore unrecognizable classes.

5. The system of claim 4, wherein an unrecognized class includes motion of a room occupant passing in a view of said video camera.

6. The system of claim 1, wherein the controller is programmed to recognize a worker positioned at the cooking appliance in a manner indicative of a cooking activity.

7. The system of claim 1, wherein the controller is programmed to recognize a stage of cooking activity indicated by the positioning of food on said cooking appliance.

8. The system of claim 1, wherein the controller is programmed to discriminate a percentage of a field of view that is above a radiant temperature threshold.

9. The system of claim 8, wherein the field of view includes a region outside the hood.

10. The system of claim 1, wherein the controller is programmed to recognize movement of a worker positioned at the cooking appliance in a manner indicative of a cooking activity.

* * * * *